(12) United States Patent
Oike

(10) Patent No.: US 8,416,280 B2
(45) Date of Patent: Apr. 9, 2013

(54) VIDEO CONFERENCE SYSTEM, BAND CONTROL METHOD, CONFERENCE CONTROL DEVICE, VIDEO CONFERENCE TERMINAL DEVICE AND RECORDING MEDIUM RECORDING PROGRAM

(75) Inventor: Kenji Oike, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 634 days.

(21) Appl. No.: 12/654,503

(22) Filed: Dec. 22, 2009

(65) Prior Publication Data

US 2010/0165072 A1    Jul. 1, 2010

(30) Foreign Application Priority Data

Dec. 29, 2008  (JP) ................................. 2008-335754

(51) Int. Cl.
*H04N 7/15* (2006.01)
*H04L 12/66* (2006.01)
*G06F 15/16* (2006.01)
*G09B 5/00* (2006.01)

(52) U.S. Cl. .................. 348/14.09; 340/4.37; 348/14.08; 348/14.1; 348/729; 370/260; 370/264; 370/352; 455/552.1; 709/204; 715/753; 725/125

(58) Field of Classification Search .............. 348/14.09, 348/729, 14.08, 14.1; 370/264, 352, 260; 709/204; 725/125; 340/4.37; 455/552.1; 715/753

See application file for complete search history.

(56) References Cited

U.S. PATENT DOCUMENTS

| | | | | |
|---|---|---|---|---|
| 4,982,440 A | * | 1/1991 | Dufresne et al. | 725/125 |
| 4,995,071 A | * | 2/1991 | Weber et al. | 348/14.08 |
| 5,126,840 A | * | 6/1992 | Dufresne et al. | 725/125 |
| 5,602,580 A | * | 2/1997 | Tseng | 348/729 |
| 6,466,252 B1 | * | 10/2002 | Miyazaki | 370/260 |
| 6,774,927 B1 | * | 8/2004 | Cohen et al. | 348/14.1 |
| 7,152,093 B2 | * | 12/2006 | Ludwig et al. | 709/204 |
| 7,559,031 B2 | * | 7/2009 | Kawamura et al. | 715/753 |
| 8,228,360 B2 | * | 7/2012 | Hamilton | 348/14.01 |
| 8,230,012 B2 | * | 7/2012 | AbiEzzi et al. | 709/204 |
| 2005/0254440 A1 | * | 11/2005 | Sorrell | 370/264 |
| 2007/0167188 A1 | * | 7/2007 | Linden | 455/552.1 |

(Continued)

FOREIGN PATENT DOCUMENTS

JP    A-2006-74359    3/2006

OTHER PUBLICATIONS

Office Action issued in Japanese application No. 2008-335754 dated Jul. 24, 2012 (with translation).

*Primary Examiner* — Gerald Gauthier

(74) *Attorney, Agent, or Firm* — Oliff & Berridge, PLC

(57) ABSTRACT

A conference control device includes: a communication processing unit which performs transmission/reception processing of conference information containing voice information and image information between the conference control device and a plurality of video conference terminal devices through a network; an information collecting unit which collects information on connection paths between the conference control device and the respective video conference terminal devices; a grouping unit which sorts the plurality of video conference terminal devices into a plurality of groups based on information on the connection paths collected by the information collecting unit; a band monitoring unit which monitors a use band of the communication processing unit in accordance with every group; and a bandwidth control unit which is, when the group having the use band of less than a predetermined value is detected by the band monitoring unit, controls the bandwidth of the video conference terminal devices belonging to the group.

14 Claims, 22 Drawing Sheets

U.S. PATENT DOCUMENTS

2009/0009356 A1* 1/2009 Stepanian ............... 340/825.24
2009/0310601 A1* 12/2009 Kawahata .................. 370/352
2010/0165072 A1* 7/2010 Oike ........................ 348/14.09
2010/0182394 A1* 7/2010 Zhan ........................ 348/14.01

* cited by examiner

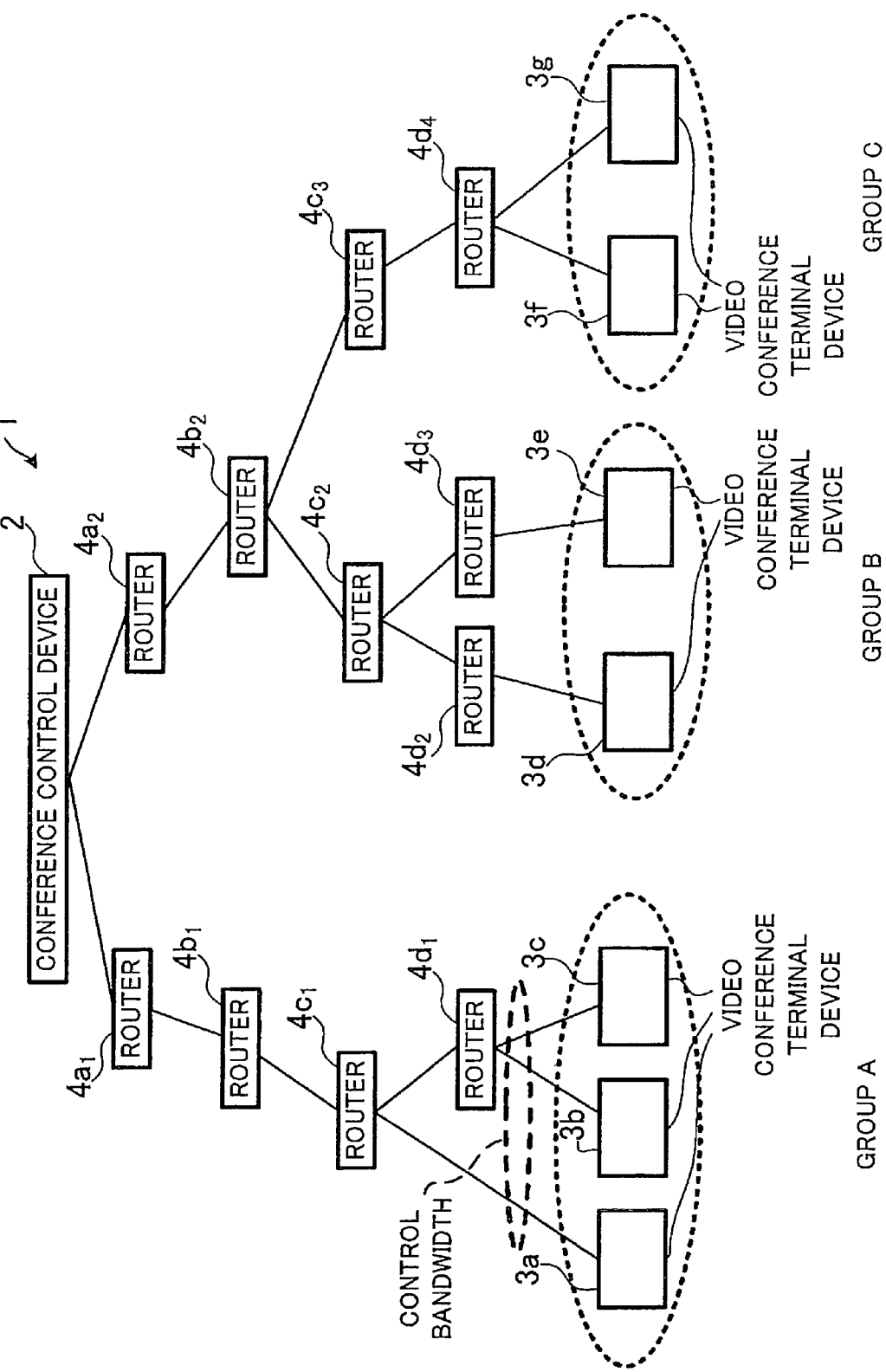

Fig. 8

| USER INPUTTING SCREEN |

USAGES OF      ☑ SPEAKER    ☐ LISTENER
TERMINALS

DEGREE OF IMPORTANCE OF USER

·POSITION    ☐ PRESIDENT  ☑ MANAGER    ☐ SECTION        ☐ ORDINARY
                                          MANAGER           STAFF

·ACHIEVEMENT ☑ ACHIEVEMENT A  ☐ ACHIEVEMENT B  ☐ ACHIEVEMENT C

·YEARS OF    ☑ 20 YEARS   ☐ 10 YEARS OR   ☐ 5 YEARS OR   ☐ LESS THAN
 EXPERIENCE    OR MORE      MORE AND         MORE AND        5 YEARS
                            LESS THAN        LESS THAN
                            20 YEARS         10 YEARS

[ SET ]

Fig.9

| CONFERENCE SETTING INPUTTING SCREEN | | | |
|---|---|---|---|
| DECISION OF PRIORITY | ☐ SPEECH AMOUNT | ☐ USAGE OF TERMINAL | ☑ DEGREE OF IMPORTANCE OF USER | ☐ PHYSICAL DISTANCE |
| SET PRIORITY | ☐ SET | ☑ NOT SET | | |
| GROUPING METHOD | ☑ DEGREE OF AGREEMENT OF PATHS | ☐ SAME ROUTER | ☐ DOMAIN | |

SET

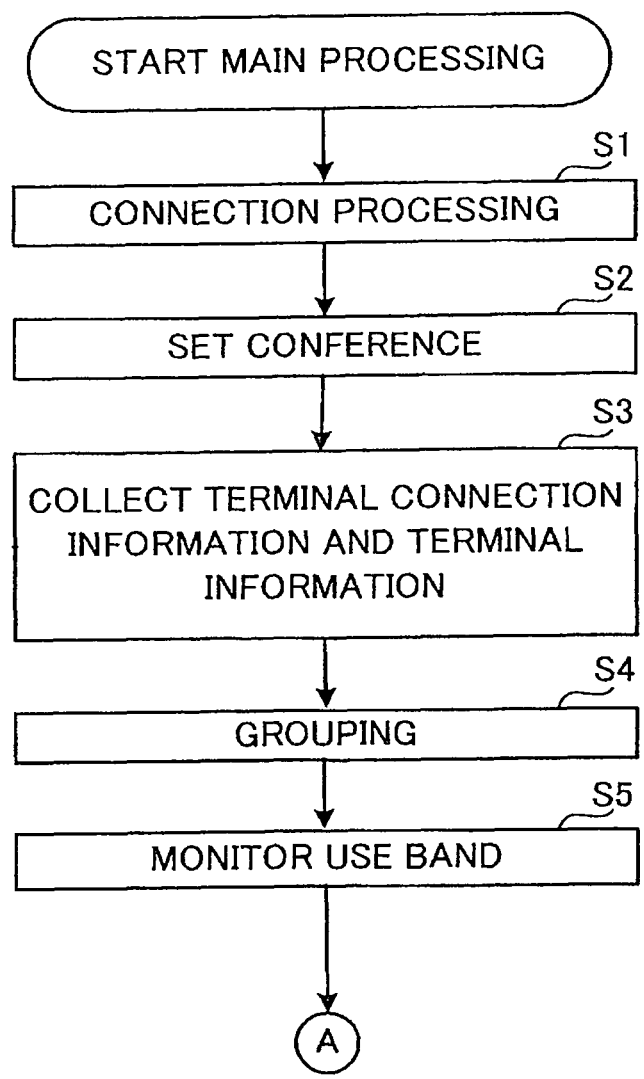

VIDEO CONFERENCE SYSTEM, BAND CONTROL METHOD, CONFERENCE CONTROL DEVICE, VIDEO CONFERENCE TERMINAL DEVICE AND RECORDING MEDIUM RECORDING PROGRAM

CROSS-REFERENCE TO RELATED APPLICATIONS

This application is based on and claims the benefit of priority from Japanese Patent Application No. 2008-335754 filed on Dec. 29, 2008, the entire contents of which are incorporated herein by reference.

BACKGROUND

1. Field

The present invention relates to a video conference system, a band control method, a conference control device, a video conference terminal device and a recording medium recording a program, and more particularly to a video conference system, a band control method, a conference control device, a video conference terminal device and a recording medium recording a program which can control a bandwidth.

2. Description of the Related Art

Conventionally, as a communication system which uses an IP network, there has been known a video conference system which includes a MCU (Multi point Control Unit) and video conference terminal devices. In this video conference system, conference information such as voice information and image information is transmitted or received between the MCU and the video conference terminal devices through the IP network. Here, the video conference system provides the video conference by displaying voices, images and the like corresponding to the conference information by a display part or the like which is mounted on each video conference terminal device.

However, in the network such as the Internet, a large number of people use the network for various purposes including web browsing besides users of the above-mentioned video conference. Accordingly, there may be a case where the users of the above-mentioned video conference system and the users of the network other than the users of the video conference system (hereinafter referred to as "other users") simultaneously use the network. In such a case, according to this video conference system, depending on the use condition of the network by other users, a band which the users of the video conference system can use (hereinafter referred to as "use band") may be changed. Accordingly, in such a video conference system, a necessary bandwidth cannot be ensured when the use band is changed thus giving rise to a possibility that the transmission/reception of voice information, image information or the like is delayed or interrupted in the course of the transmission/reception.

To overcome such a drawback, there has been proposed a conference system which performs a control of a bandwidth of a conference terminal device where, when a use band of a conference system is changed during the conference, the bandwidth of the conference terminal device is controlled corresponding to a change of the use band.

For example, there has been proposed a conference system which can, by dynamically controlling a compression rate of voice data by monitoring the congestion of the network based on a transmission/reception state of the voice data, realize the conference with voices of high quality during a usual state, and realize the conference with voices of low quality while preventing the interruption of voice or the delay of the transmission/reception of voice information during the congestion of the network.

Such a conference system controls a bandwidth in accordance with a use band for every conference terminal device.

SUMMARY

However, with respect to the above-mentioned conventional conference system, it is often the case where the control of the bandwidth in accordance with the use band for every conference terminal device is not appropriate depending on a congestion state of the network.

The present invention has been made in view of the above-mentioned drawbacks, and it is an object of the present invention to provide a video conference system, a band control method, a conference control device, a video conference terminal device and a recording medium which records a program which can effectively control a bandwidth corresponding to a congestion state of a network.

To achieve the above-mentioned object, according to one aspect of the present invention, there is provided a conference control device which includes: a communication processing unit which is configured to perform transmission/reception processing of conference information containing voice information and image information between the conference control device and a plurality of video conference terminal devices through a network; an information collecting unit which is configured to collect information on connection paths between the conference control device and the respective video conference terminal devices; a grouping unit which is configured to sort the plurality of video conference terminal devices into a plurality of groups based on information on the connection paths collected by the information collecting unit; a band monitoring unit which is configured to monitor a use band of the communication processing unit in accordance with every group; and a bandwidth control unit which is configured to, when the presence of the group having the use band of less than a predetermined value is detected by the band monitoring unit, control the bandwidth of the video conference terminal devices which belong to the group.

To achieve the above-mentioned object, according to another aspect of the present invention, there is provided a recording medium for recording a computer readable program, the program allowing the computer to execute the steps of: performing transmission/reception processing of conference information containing voice information and image information between the computer and a plurality of video conference terminal devices through a network using a communication processing part; collecting information on connection paths between the computer and the respective video conference terminal devices; sorting the plurality of video conference terminal devices into a plurality of groups based on collected information on the connection paths; monitoring a use band of the communication processing part in accordance with every group; and controlling, when the group having the use band of less than a predetermined value is present, the bandwidth of the respective video conference terminal devices which belong to the group.

To achieve the above-mentioned object, according to another aspect of the present invention, there is provided a band control method in a conference control device comprising the steps of: performing transmission/reception processing of conference information containing voice information and image information between a conference control device and a plurality of video conference terminal devices through a network using a communication processing unit; collecting information on connection paths between the conference control device and the respective video conference terminal devices; sorting the plurality of video conference terminal devices into a plurality of groups based on collected information on the connection paths; monitoring a use band of the communication processing unit in accordance with every group; and controlling, when the group having the use band of less than a predetermined value is present, the bandwidth of the respective video conference terminal devices which belong to the group.

To achieve the above-mentioned object, according to still another aspect of the present invention, there is provided a video conference system which includes: a plurality of video conference terminal devices; and a conference control device which is connected to the video conference terminal devices through a network and is configured to control communication between the conference control device and the video conference terminal devices, wherein the conference control device comprises: a communication processing unit which is configured to perform transmission/reception processing of conference information containing voice information and image information between the conference control device and the video conference terminal devices through a network; an information collecting unit which is configured to collect information on connection paths between the conference control device and the respective video conference terminal devices; a grouping unit which is configured to sort the plurality of video conference terminal devices into a plurality of groups based on information on the connection paths collected by the information collecting unit; a band monitoring unit which is configured to monitor a use band of the communication processing unit in accordance with every group; and a bandwidth control unit which is configured to, when the presence of the group having the use band of less than a predetermined value is detected by the band monitoring unit, control the bandwidth of the video conference terminal devices which belong to the group.

To achieve the above-mentioned object, according to further aspect of the present invention, there is provided a video conference terminal device in a video conference system which is connected to a plurality of video conference terminal devices through a network and performs conference communication between the video conference terminal devices, wherein the video conference terminal device includes: a communication processing unit which is configured to perform transmission/reception processing of conference information containing voice information and image information between the video conference terminal device which constitutes an own device and a video conference terminal device which constitutes a communication partner through the network; an information collecting unit which collects information on connection paths between the own device and the video conference terminal device which constitutes the communication partner; a grouping unit which is configured to sort the plurality of video conference terminal devices into a plurality of groups based on information on the connection paths collected by the information collecting unit; a band monitoring unit which is configured to monitor a use band of the group which includes the own device out of the groups formed by grouping; and a bandwidth control unit which is configured to, when the presence of the group having the use band of less than a predetermined value is detected by the band monitoring unit, control a bandwidth of the communication processing unit or a bandwidth of the video conference terminal devices which belong to the group to which the own device belongs.

BRIEF DESCRIPTION OF THE DRAWINGS

FIG. 5 is a view showing an operation of the video conference system which follows the operation shown in FIG. 4;

FIG. 8 is a view showing one example of a user information inputting screen according to the first embodiment of the present invention;

FIG. 9 is a view showing one example of a conference setting inputting screen according to the first embodiment of the present invention;

FIG. 10A is a flowchart showing one example of main processing in the conference control device according to the first embodiment of the present invention;

DETAILED DESCRIPTION

Hereinafter, modes for carrying out the present invention (hereinafter referred to as embodiment) are explained in conjunction with attached drawings.

First Embodiment

[Summary of Video Conference System 1]

Figure 1:
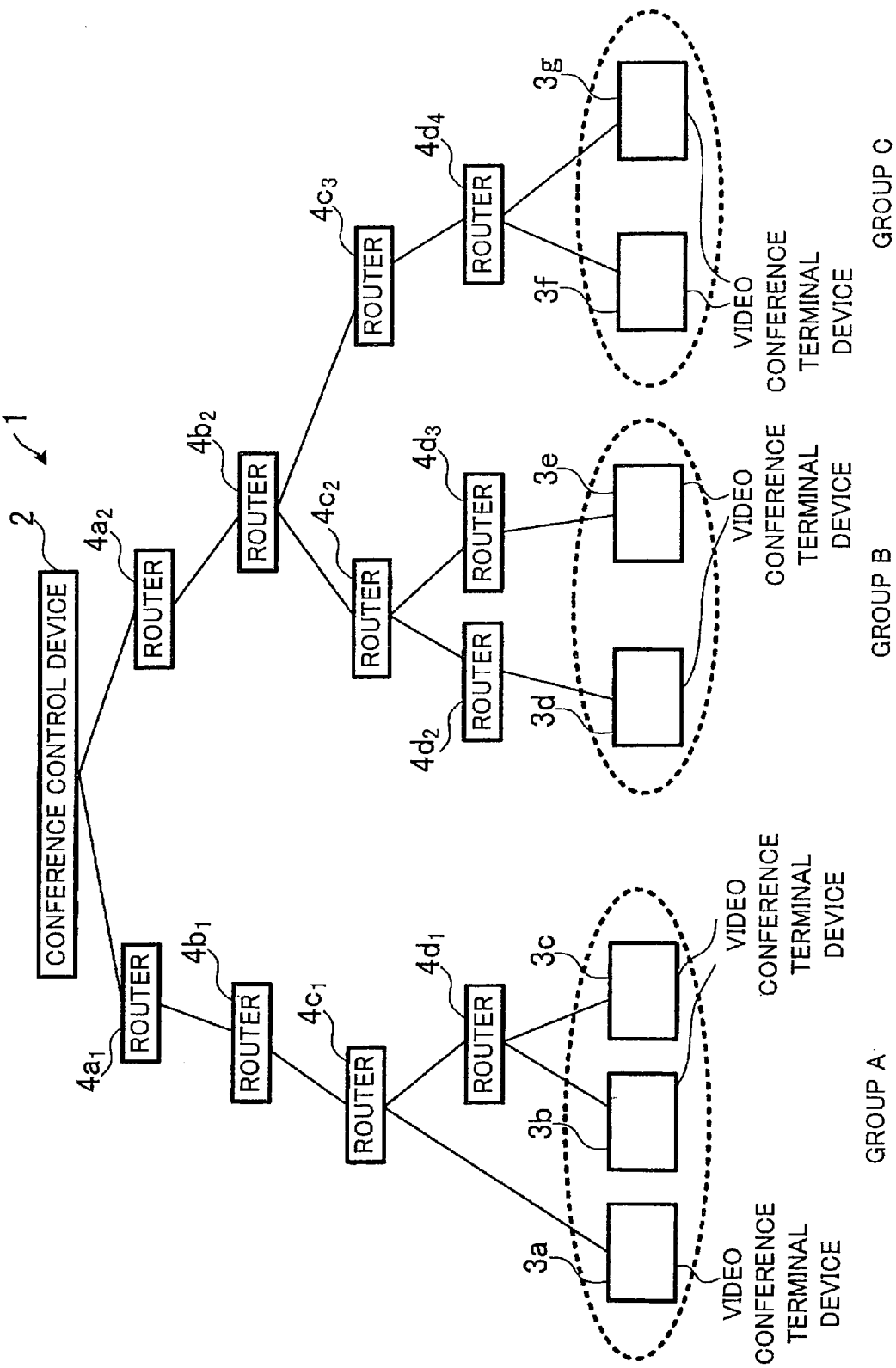
FIG. 1 is a view showing the schematic constitution of a video conference system according to a first embodiment of the present invention.

The summary of the video conference system according to the first embodiment of the present invention is explained in conjunction with FIG. 1.

As shown in FIG. 1, the video conference system 1 is constituted of a conference control device 2 and a plurality of video conference terminal devices 3a to 3g. The conference control device 2 is connected with the plurality of video conference terminal devices 3a to 3g through a plurality of routers 4a to 4d arranged on an IP network such as the Internet. In this embodiment, the video conference system 1 includes seven sets of video conference terminal devices 3a to 3g. However, the number of video conference terminal devices is not limited to seven. Further, in the description made hereinafter, in designating an arbitrary video conference terminal device out of the plurality of video conference terminal devices 3a to 3g, the designated video conference terminal device is referred to as "video conference terminal device 3".

In the video conference system 1, the video conference is held in a form that information containing voice information and image information (hereinafter referred to as "conference information") is transmitted and received between the conference control device 2 and the plurality of video conference terminal devices 3a to 3g.

Particularly, in the video conference system 1, grouping processing, use band monitoring processing and bandwidth controlling processing which are characteristic processing of this embodiment are performed. These characteristic processing are explained in conjunction with drawings.

Figure 2:
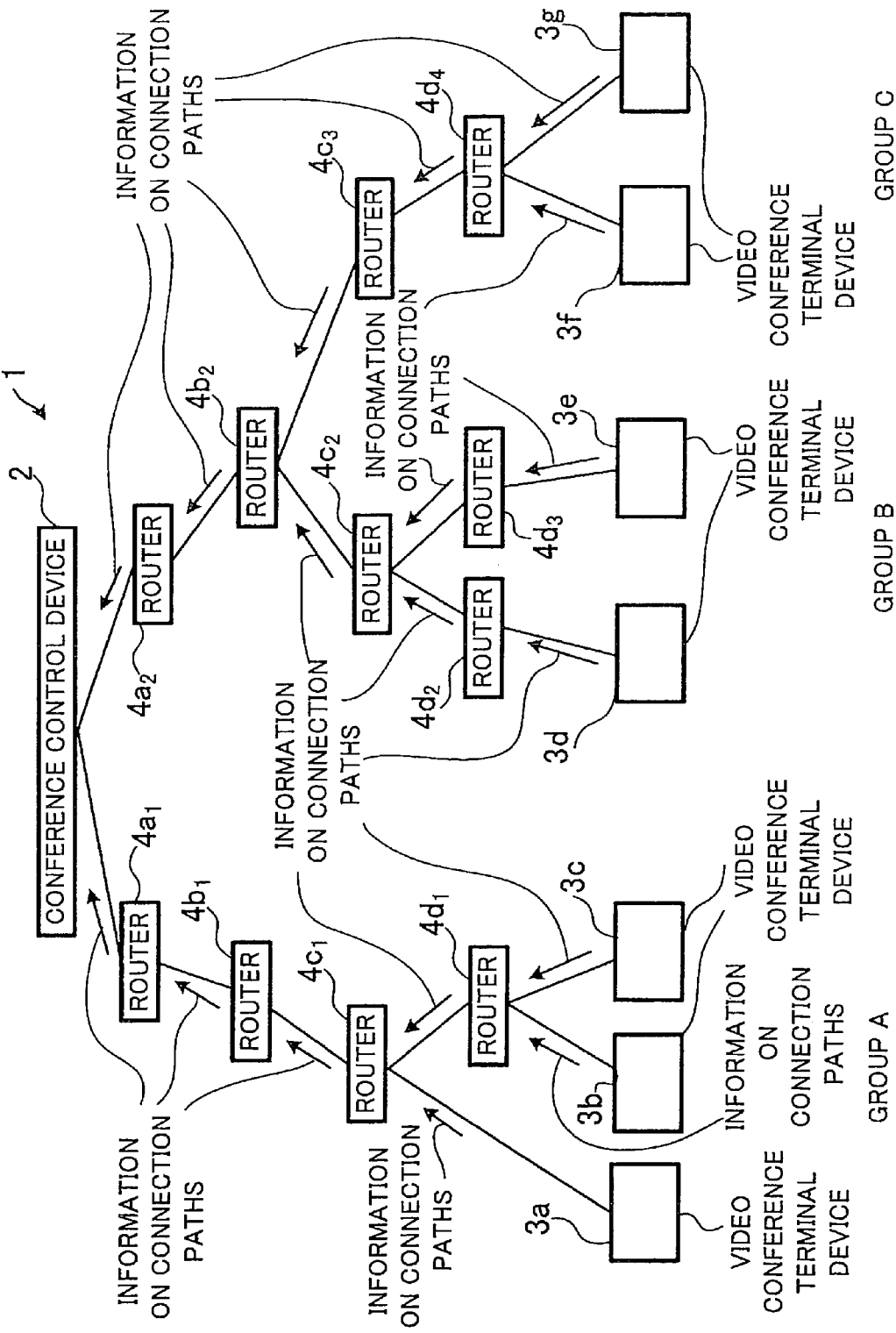
FIG. 2 is a view showing an operation of the video conference system according to the first embodiment of the present invention.

As shown in FIG. 2, in the video conference system 1, the conference control device 2 collects information on connection paths between the conference control device 2 and the video conference terminal devices 3a to 3g. Here, as the information on the connection paths, IP addresses of routers $4a_1$ to $4d_1$ which are arranged between the conference control device 2 and the video conference terminal devices 3a to 3g are collected, for example. To be more specific, as the information on the connection path of the video conference terminal device 3a, the IP addresses of the routers $4a_1$, $4b_1$, $4c_1$ are collected.

Figure 3:
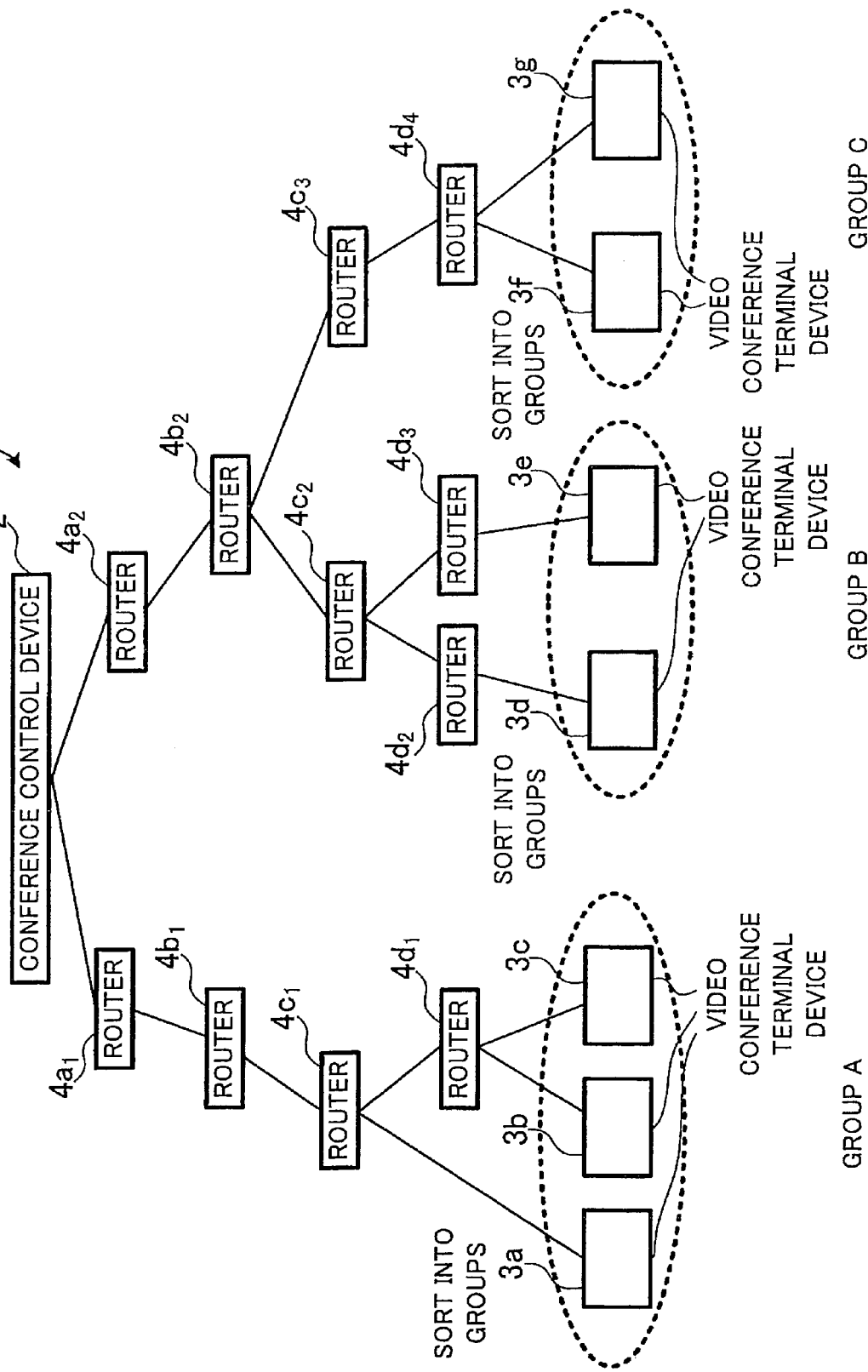
FIG. 3 is a view showing an operation of the video conference system which follows the operation shown in FIG. 2.

As shown in FIG. 3, after collecting the information on the connection paths, the conference control device 2 sorts the plurality of video conference terminal devices 3a to 3g into a plurality of groups based on the collected information on the connection paths. The plurality of video conference terminal devices 3a to 3g are sorted into the plurality of groups based on the degree of agreement of the connection paths, for example. To be more specific, the video conference terminal device 3a is sorted into the group A together with the video conference terminal devices 3b, 3c having high degree of agreement of the connection paths. In the same manner as the video conference terminal devices 3a, 3b, 3c, the video conference terminal devices 3d, 3e are sorted into the group B. Further, the video conference terminal devices 3f, 3g are sorted into the group C.

Figure 4:
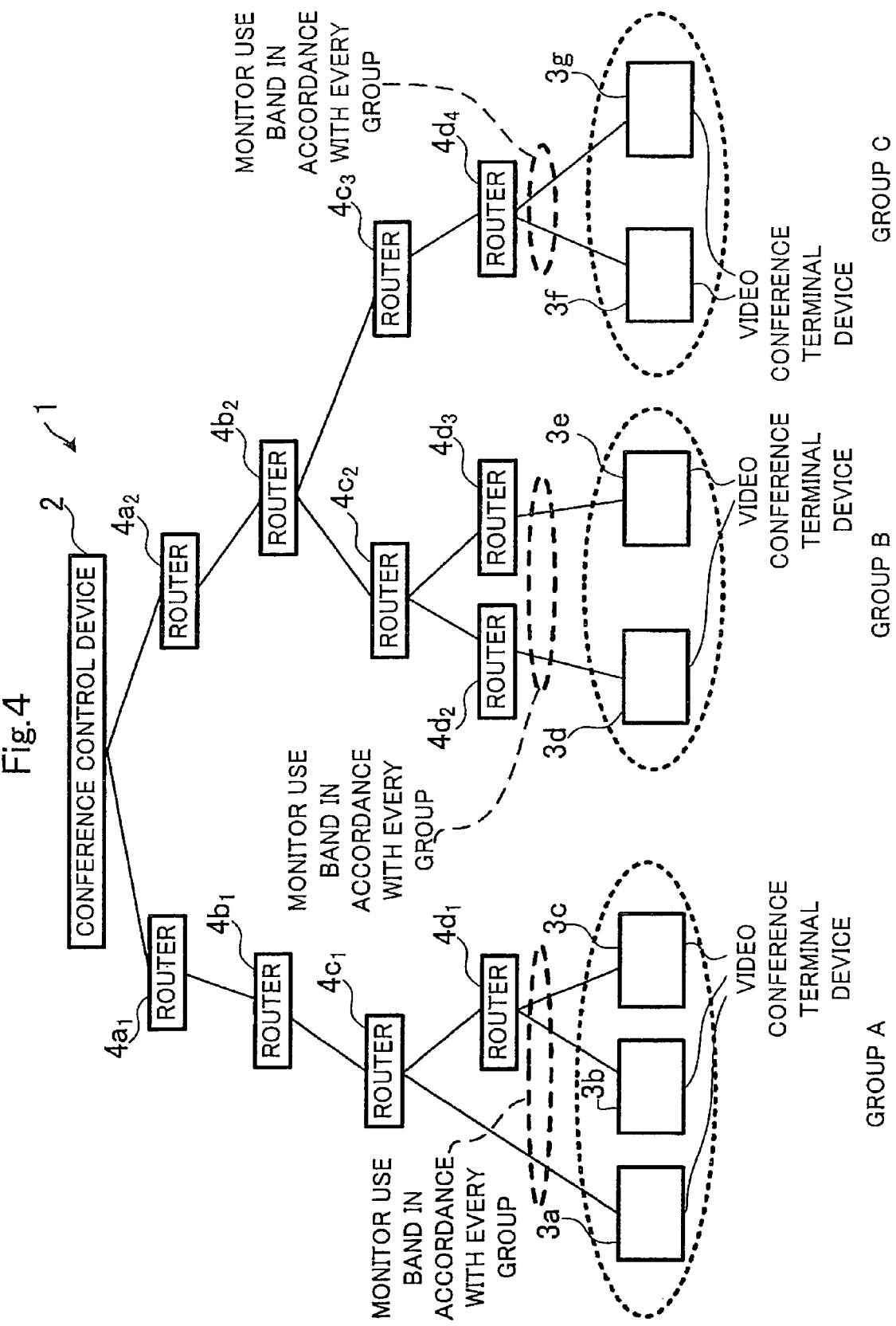
FIG. 4 is a view showing an operation of the video conference system which follows the operation shown in FIG. 3.

As shown in FIG. 4, the conference control device 2 monitors information amount which can be transmitted or received per unit time (hereinafter referred to as "use band") in accordance with every group. For example, the conference control device 2 monitors the use band for the group A, the group B and the group C respectively. To be more specific, in monitoring the use band of the group A, the conference control device 2 detects the use bands of the video conference terminal devices 3a, 3b, 3c which belong to the group A respectively. Then, the conference control device 2 calculates the use band of the group A by putting the use bands of the respective video conference terminal devices 3a, 3b, 3c together. Here, at the time of monitoring the use band, the conference control device 2 also determines whether or not the use band in accordance with every group which is the result of monitoring is less than a preset predetermined value.

As shown in FIG. 5, when the group whose use band is less than the predetermined value is present, the conference control device 2 controls information amount which is transmitted or received between the conference control device 2 and the video conference terminal device 3 which belong to the group per unit time (hereinafter referred to as "bandwidth"). For example, when the use band of the group A is less than the preset predetermined value, the conference control device 2 controls the bandwidths of the video conference terminal devices 3a, 3b, 3c which belong to the group A.

Figure 6A:
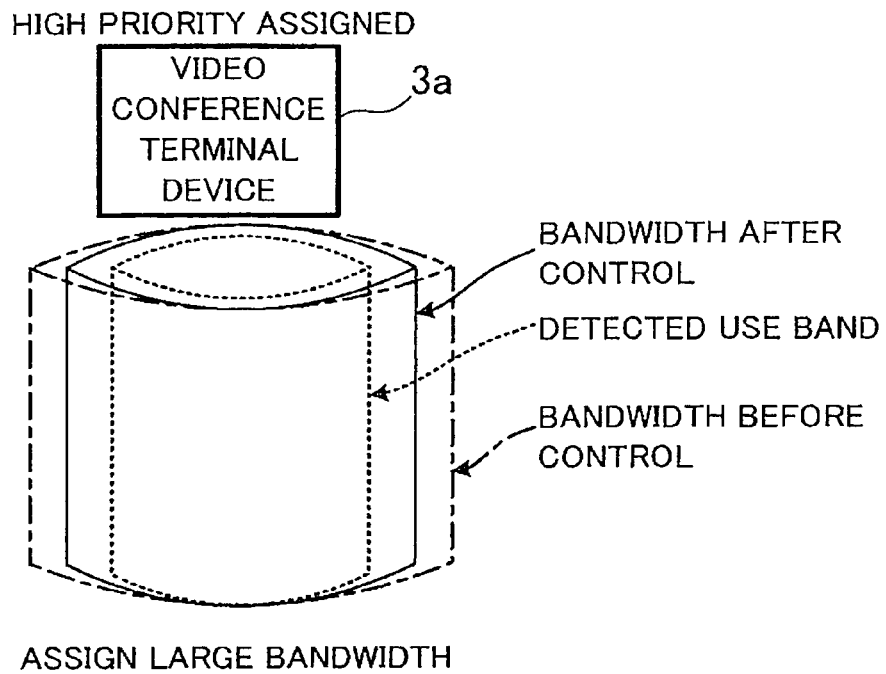
FIG. 6A is a view showing processing which controls a bandwidth.
Figure 6B:
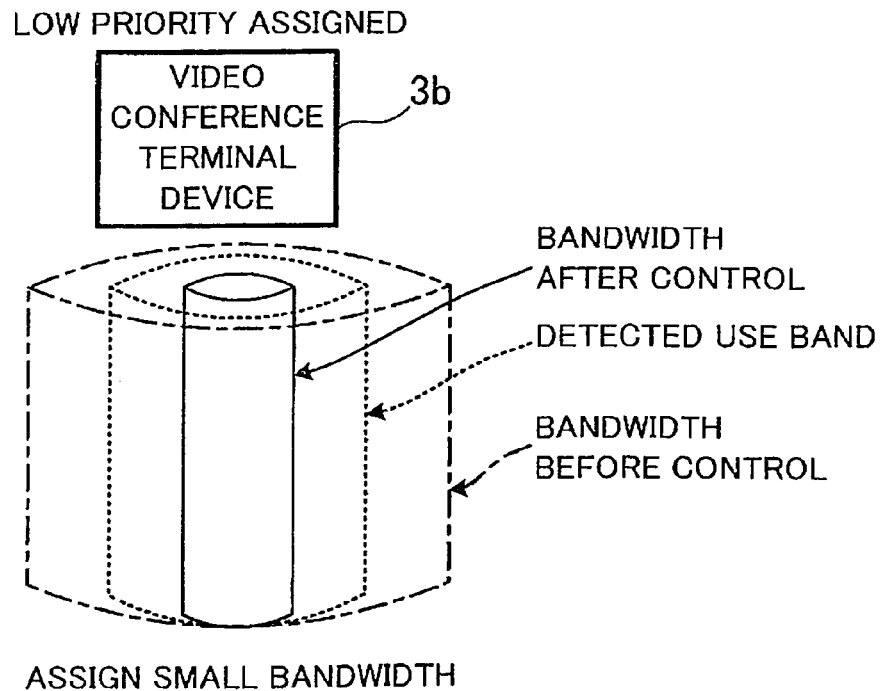
FIG. 6B is also a view showing processing which controls a bandwidth.
Figure 6C:
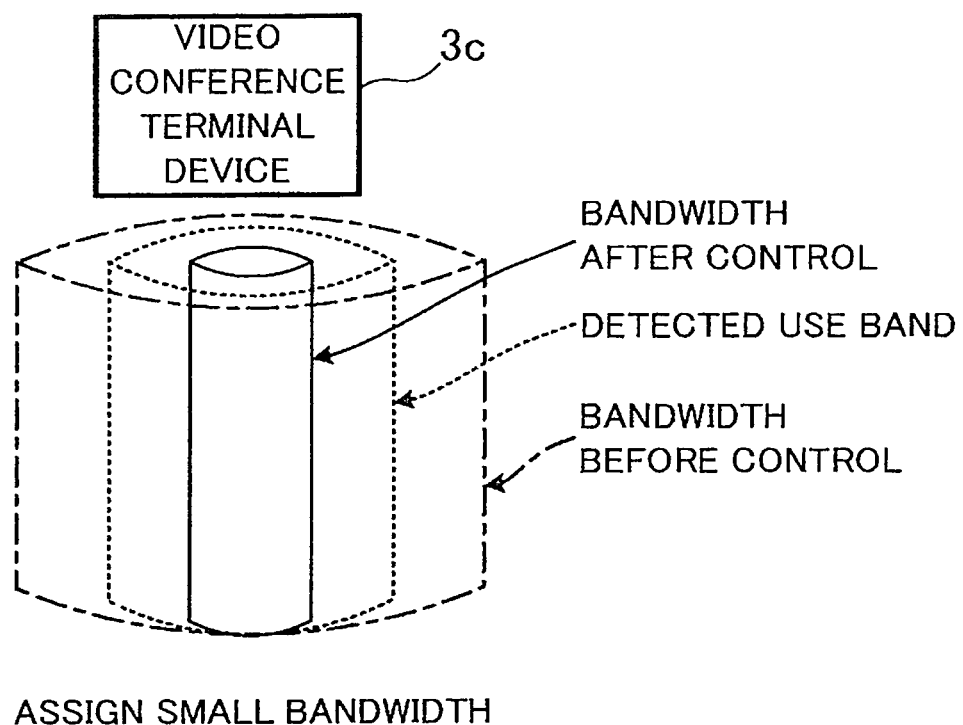
FIG. 6C is also a view showing processing which controls a bandwidth.

Here, as shown in FIG. 6A to FIG. 6C, assume that priority is assigned among the video conference terminal devices 3a, 3b, 3c which belong to the group A, the bandwidths are allocated in accordance with the priority. That is, when the high priority is assigned to the video conference terminal device 3a and low priority is assigned to the video conference terminal devices 3b, 3c, the bandwidth after control which is smaller than the band width before control but is larger than the detected use band is allocated to the video conference terminal device 3a (see FIG. 6A). On the other hand, the bandwidth after control which is smaller than the detected use band is allocated to the video conference terminal devices 3b, 3c (see FIG. 6B and FIG. 6C). Due to such a control, in the video conference terminal device 3a to which high priority is assigned, the reduction of the bandwidth which takes place when the use band is changed is alleviated.

As described above, according to the video conference system 1 of this embodiment, it is possible to effectively control the bandwidth corresponding to a congestion state of the network.

That is, in a conventional video conference system, a bandwidth is controlled for every video conference terminal device 3 and hence, the bandwidth can be controlled only corresponding to a change of the use band. To the contrary, the video conference system 1 of this embodiment can control the bandwidths of the video conference terminal devices 3 within the group in accordance with every group and hence, the video conference system 1 can perform the effective bandwidth control.

For example, in the constitution shown in FIG. 1, when traffic between the routers $4b_1$, $4c_1$ is congested, the use bands of the video conference terminal devices 3a, 3b, 3c become small respectively. In such a case, according to the conventional video conference system, the bandwidths of the respective video conference terminal devices 3a, 3b, 3c are also controlled to be decreased corresponding to the change of the use bands respectively. To the contrary, according to the video conference system 1 of this embodiment, the bandwidths of the video conference terminal devices 3a, 3b, 3c are controlled corresponding to the use band of the whole group consisting of the video conference terminal devices 3a, 3b, 3c without using the respective use bands of the video conference terminal devices 3a, 3b, 3c.

Accordingly, for example, to consider a case where the conference control device 2 sets the priority among the video conference terminal devices 3 in the group and controls the bandwidths of the video conference terminal devices 3 in accordance with priority, the large bandwidth is allocated to the video conference terminal device 3 to which high priority is assigned and the small bandwidth is allocated to the video conference terminal device 3 to which low priority is assigned. Accordingly, the conference control device 2 can alleviate the reduction of the bandwidth of the video conference terminal device 3 to which high priority is assigned.

The above-mentioned priority determines magnitudes of bandwidths allocated among the video conference terminal devices 3 within the group in controlling the bandwidths. Accordingly, it is necessary to set this priority among the video conference terminal devices 3 within the group. Further, in the video conference system 1, the conference control device 2 allocates the bandwidths among the video conference terminal devices 3 within the sorted group. Then, the conference control device 2 alleviates the reduction of the bandwidth of the video conference terminal device 3 to which high priority is assigned. Accordingly, in sorting the video conference terminal devices into groups, it is desirable to sort a plurality of video conference terminal devices 3 to one group.

[Specific Constitution of Conference Control Device 2]

Next, the conference control device 2 according to the first embodiment is explained in detail in conjunction with one specific example.

Figure 7:
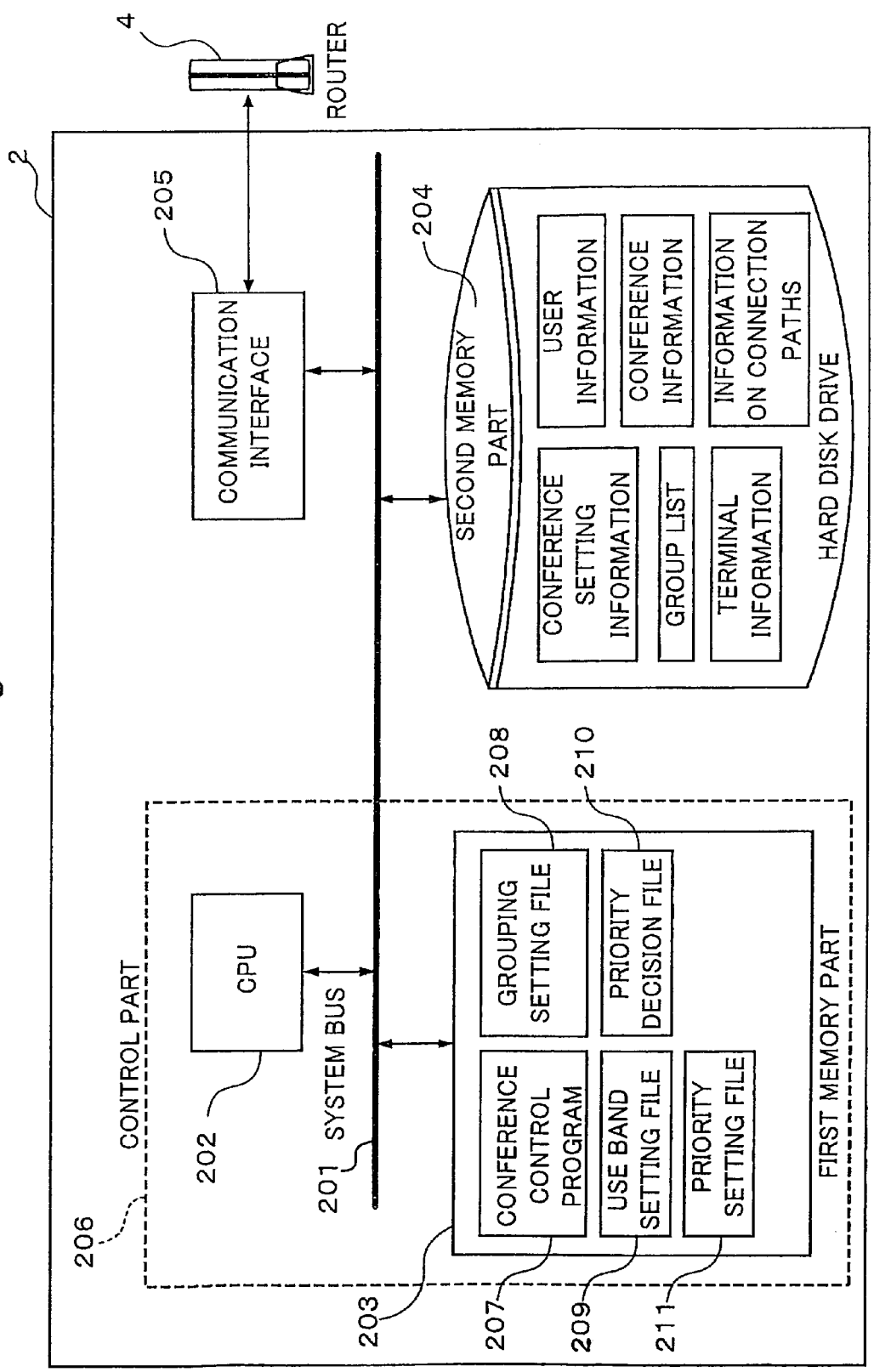
FIG. 7 is a block diagram showing the specific constitution of a conference control device according to the first embodiment of the present invention.

The conference control device 2 is a device for connecting the video conference terminal devices 3 which are installed at a plurality of locations. The conference control device 2 may be formed of an MCU (Multi point control Unit), for example. The conference control device 2 may be constituted using a general-purpose server computer. As shown in FIG. 7, the conference control device 2 includes a CPU (Central Processing Unit) 202, a first memory part 203 which constitutes a rewritable main memory device for storing a conference control program 207 and the like, a second memory part 204 which is constituted of an HDD (Hard Disk Drive) or the like which stores various information, and a communication interface (IF) 205 which is provided for communication between the conference control device 2 and the video conference terminal devices 3 which are connected to the network through routers 4. These various constitutional elements are interconnected with each other via a system bus 201. In this embodiment, a control part 206 is constituted of the CPU 202 and the first memory part 203.

(First Memory Part 203)

The first memory part 203 stores the conference control program 207 which imparts fundamental functions to the conference control device 2 as a computer and allows the conference control device 2 to function as various units. The conference control program 207 is read by the CPU 202. Then, functions in accordance with the conference control program 207 are executed by the CPU 202. Further, in the first memory part 203, a grouping setting file 208, a use band setting file 209, a priority decision file 210 and a priority setting file 211 are also stored.

The grouping setting file 208 is a file which sets "predetermined degree of agreement" described later which becomes a reference value for executing grouping in accordance with "degree of agreement of connection paths" described later. For example, when "predetermined degree of agreement" is set to 75%, the video conference terminal devices 3 with the degree of agreement of connection paths set to 75% or more are sorted into the same group. In this embodiment, "predetermined degree of agreement" is set to 75%. However, "predetermined degree of agreement" is not limited to such a value.

The use band setting file 209 is a file which sets a predetermined value to be compared with the use band of the video conference terminal device 3 when it is determined whether or not the bandwidth of the video conference terminal device 3 is controlled based on the use band of the video conference terminal device 3. For example, when the predetermined value is set to 1 Mbps, the bandwidth is controlled on a condition that the use band is less than 1 Mbps. In this use band setting file 209, it is possible to set a predetermined value in accordance with every group used for the determination whether or not the bandwidth is controlled in accordance with every group and a predetermined value for every video conference terminal device 3 for the determination whether or not the bandwidth is controlled for every video conference terminal device 3. Further, in this embodiment, the predetermined value in accordance with every group is set to 3 Mbps and the predetermined value for every video conference terminal device 3 is set to 0.8 Mbps. However, these predetermined values are not limited to such values, and the predetermined values may be set in accordance with every group or in accordance with every video conference terminal device 3.

The priority decision file 210 is a file which sets a rate of bandwidths allocated to the respective video conference terminal devices 3 within the group when the bandwidths are controlled. In the priority decision file 210, for example, based on user information described later, a rate of bandwidths is set in accordance with priority corresponding to usages in the conference held using the video conference terminal devices 3 or in accordance with priority corresponding to the degree of importance of users in the conference using the video conference terminal devices 3.

The priority setting file 211 is a file which sets priority corresponding to kinds of information contained in the conference information, and is used for controlling bandwidths. For example, when the conference information contains a voice information and image information, high priority is assigned to the voice information and low priority is assigned to image information, a large bandwidth is allocated to the voice information compared to the bandwidth of the image information.

The conference control program 207 may be downloaded to the first memory part 203 from a server or the like connected to the network through the communication IF 205, for example. Further, the conference control program 207 may be recorded in a recording medium such as a CD-ROM and, thereafter, may be read by the first memory part 203 through a recording medium drive not shown in the drawing.

(Second Memory Part 204)

The second memory part 204 stores conference setting information containing setting of conference, user information containing the degree of importance of the user, usages of the video conference terminal device 3, conference information transmitted from the video conference terminal devices 3, terminal information of the respective video conference terminal devices 3, information on connection paths between the conference control device 2 and the video conference terminal devices 3, and a group list generated at the time of grouping. The information stored in the second memory part 204 is used when the control part 206 controls the bandwidths.

The conference information is constituted of voice information and image information relating to users of the respective video conference terminal devices 3. Further, this conference information may contain, besides the voice information and the image information, for example, data information such as text data, information on usages in the conference held using the respective video conference terminal devices 3, and information on the degree of importance of the conference held by users of the respective video conference terminal devices 3 in the conference. Here, the information on usages is information indicative of positions of the video conference terminal devices 3 such as information whether the video conference terminal device 3 is a terminal where a speaker is present or a terminal where a listener is present. Further, the information on degree of the importance of the user in the conference is information indicative of the degree of importance of the user of the video conference terminal device 3, for example. That is, the information on the degree of importance of the user is information indicative of a position, achievement, years of experience and the like of the user.

The user information is used when the control part 206 decides priority, and is information relating to usages of the video conference terminal devices 3 and the degree of importance of the users. The user information contains, for example, "usages of terminals" which are information on usages of the video conference terminal devices 3 and the information on "degree of importance of users". "Usages of terminals" are information indicative of positions which the video conference terminal devices 3 play. For example, "usages of terminals" indicate a device on "speaker" side and a device on a "listener" side. Further, "degree of importance of users" is information relating to the users of the video conference terminal devices 3. This "degree of importance of users" contains information on "position", "achievement" and "years of experience" of the user, for example. In this embodiment, these information are set on a user information inputting screen shown in FIG. 8. However, setting of the information is not limited to such setting.

The group list is referenced or looked up when the bandwidths are controlled. In the group list, names of a host of the video conference terminal devices 3 which belong to a group in accordance with every group, identification information such as IP addresses of the video conference terminal devices 3, selection processing flags for selecting whether or not determination processing is performed in accordance with every group or for every video conference terminal device, and object setting processing flags for determining whether or not the bandwidths are controlled for every video conference terminal device are described.

(Control Part 206)

The control part 206 is constituted of the CPU 202 and the first memory part 203 as described above. The control part 206 systematically controls the whole conference control device 2 by allowing the CPU 202 to read the conference control program 207 stored in the first memory part 203 and to execute the conference control program 207. Further the control part 206 also functions as a communication processing unit, an information collecting unit, a grouping unit, a band monitoring unit, a bandwidth control unit, a priority memory unit, a priority decision unit, a priority setting unit, and a determination unit.

The communication processing unit performs transmission/reception processing of conference information between the control part 206 and the video conference terminal devices 3 through a network by controlling a communication IF 205. The communication processing unit also has a function of synthesizing conference information transmitted from the respective video conference terminal devices 3. For example, the communication processing unit receives image information contained in the conference information transmitted from the respective video conference terminal devices 3 through the network. Then, the communication processing unit generates synthesized image information by synthesizing these received image information. Thereafter, the communication processing unit transmits the synthesized image information to the respective video conference terminal devices 3 through the network.

The information collecting unit collects information on the connection paths between the conference control device 2 and the respective video conference terminal devices 3. As the information on connection paths, for example, the information collecting unit detects IP addresses of routers 4 which are directly connected to the respective video conference terminal devices 3 or IP addresses of the respective video conference terminal devices 3 as the information on connection paths.

The information collecting unit, in collecting the IP address of the video conference terminal device 3 as the information on the connection path, requests the transmission of IP address of the video conference terminal device 3 from the video conference terminal device 3. In performing the communication with the video conference terminal device 3 using the communication processing unit, the IP address of the video conference terminal device 3 is contained in a header or the like of a message transmitted from the video conference terminal device 3. Accordingly, the information collecting unit can collect the IP address of the video conference terminal device 3 from the header or the like of the message. When the video conference terminal device 3 is connected to the internet through a LAN (Local Area Network), in place of a local IP address, a global IP address imparted by a router in connecting the LAN to the Internet is used as the connection path information.

Further, the information collecting unit executes, in detecting an IP address of the router 4 as the information on the connection path, a command "traceroute" which displays a connection path from the conference control device 2 to the video conference terminal device 3 as a list. To be more specific, the information collecting unit sequentially transmits a packet to an IP address or a MAC address of each video conference terminal device 3 from the conference control device 2 while increasing a value of TTL (Time to Live) whose numerical value is reduced corresponding to the number of routers 4 which the packet passes. Then, the information collecting unit detects the IP address of the router provided between the conference control device 2 and the video conference terminal device 3 from a response packet transmitted from the router 4 when the TTL of the packet becomes 0. In the example shown in FIG. 1, when the command "traceroute" is executed from the conference control device 2 to the video conference terminal device 3a, the IP addresses of the router $4a_1$, router $4b_1$, router $4c_1$ provided between the conference control device 2 and the video conference terminal device 3a are detected.

The grouping unit sorts a plurality of video conference terminal devices 3 into a plurality of groups based on the information on connection paths collected by the information collecting unit. As a method for performing such grouping, for example, a method which uses "degree of agreement of connection paths", a method which uses "same router" and a method which uses "domain" are considered. Hereinafter, the respective grouping methods are explained.

The method which uses "degree of agreement of connection paths" is a method which sorts the video conference terminal devices 3 which pass the same route to the same group. In this method, the information collecting unit obtains the degree of agreement of connection paths from the conference control device 2 to the respective video conference terminal devices 3 based on a result obtained by executing the above-mentioned command "traceroute" (the IP address of the router 4). Then, the grouping unit sorts the video conference terminal devices 3 whose degree of agreement on connection paths is equal to or more than "predetermined degree of agreement" stored in the grouping setting file 208 into the same group.

In the example shown in FIG. 1, the path from the conference control device 2 to the video conference terminal device 3a takes a course which is expressed by the conference control device 2→the router $4a_1$→the router $4b_1$→the router $4c_1$→the video conference terminal device 3a. Further, the path from the conference control device 2 to the video conference terminal device 3b takes a course which is expressed by the conference control device 2→the router $4a_1$→the router $4b_1$→the router $4c_1$→the router $4d_1$→the video conference terminal device 3b. Further, the path from the conference control device 2 to the video conference terminal device 3c takes a course which is expressed by the conference control device 2→the router $4a_1$→the router $4b_1$→the router $4c_1$→the router $4d_1$→the video conference terminal device 3c. Here, the degree of agreement of connection paths of the video conference terminal devices 3a, 3b, 3c is a predetermined value (for example, 75%) or more and hence, the video conference terminal devices 3a, 3b, 3c are sorted into the same group.

Further, the method which uses "same router" is a method which sorts the video conference terminal devices 3 which are directly connected to the same router 4 to the same group. To be more specific, the information collecting unit obtains the router 4 which is directly connected to the video conference terminal devices 3 based on a result obtained by executing the above-mentioned command "traceroute". Then, the grouping unit sorts a plurality of video conference terminal devices 3 which are connected to the same router 4 to the same group. "Directly connected" implies that the video conference terminal device 3 is connected to the router without via other routers. In the example shown in FIG. 1, the video conference terminal devices 3b, 3c are directly connected to the same router routers $4d_1$. Accordingly, the video conference terminal devices 3b, 3c are sorted into the same group.

Further, the method which uses "domain" is a method which groups the video conference terminal devices 3 using a domain. In such a method, the grouping unit makes an inquiry with respect to a domain to a DNS server based on IP addresses of the video conference terminal devices 3 transmitted from the respective video conference terminal devices 3, and sorts the video conference terminal devices 3 which belong to the same domain into the same group. For example, the information collecting unit determines the domain to which the respective video conference terminal devices 3 belong based on the IP addresses of the video conference terminal devices 3 by executing a command "nslookup" which checks the relevance between the domain and the IP addresses corresponding to the domain. Then, the grouping unit sorts the video conference terminal devices 3 which belong to the same domain to the same group.

The band monitoring unit, as described previously, monitors the use band of the communication processing unit in accordance with every group. The band monitoring unit detects the use bands of the respective video conference terminal devices 3 which belong to the group. Then, the band monitoring unit puts the detected use bands of the respective video conference terminal devices 3 together thus calculating the use band of the group. Further, the band monitoring unit also has functions of comparing the calculated use band of the group and the predetermined value set by the use band setting file 209 and of determining whether or not the calculated use band is less than the predetermined value.

For example, in monitoring the use band of the group A shown in FIG. 1, the band monitoring unit firstly detects the use band of the respective video conference terminal devices 3a, 3b, 3c which belong to the group A. Assume that the use bands of the respective video conference terminal devices 3a, 3b, 3c are 0.8 Mbps, the band monitoring unit put the use bands of the video conference terminal devices 3a, 3b, 3c together so that the use band of the group A becomes 2.4 Mbps. Then, the band monitoring unit compares this monitoring result (the use band of the group A) and the predetermined value set by the use band setting file 209. Assume that the predetermined value set by the use band setting file 209 is 3 Mbps, the band monitoring unit determines that the use band of the group A is less than the predetermined value.

The priority memory unit stores priority in allocation of the bandwidth to the respective video conference terminal devices 3 (hereinafter referred to as "priority"). In this priority memory unit, information relating to usages of terminals or information relating to the degree of importance of users is stored as the above-mentioned priority, for example.

The priority decision unit decides priority in allocation of the bandwidth to the respective video conference terminal devices 3. As a method for deciding this priority, for example, a method which uses "speech amount", a method which uses "usages of terminals", "the degree of importance of users" and a method which uses "physical distance" are considered. Hereinafter, the respective methods for deciding a priority are explained.

The method which uses "speech amount" is a method which decides priority corresponding to speech amounts of users of the respective video conference terminal devices 3 during the conference. In this method, for example, the priority decision unit assigns high priority to the video conference terminal device 3 which is determined to be used by the user who speaks most using a determination unit described later.

The method which uses "usages of terminals" is a method which decides priority corresponding to usages of the video conference terminal devices 3. In this method, the priority decision unit, for example, in the conference where the relationship between "speaker" and "listener" is established, decides priority depending on whether the video conference terminal device 3 is a video conference terminal device on a "speaker" side or a video conference terminal device on a "listener" side. For example, the priority decision unit decides to assign high priority to the video conference terminal device on the "speaker" side.

The method which uses "the degree of importance of users" is a method which decides priority corresponding to the degree of importance of users (for example, positions of users, achievements of users or years of experience of users). In this method, for example, the priority decision unit can decide priority corresponding to positions of users, and the higher the position of the user, the higher the priority is assigned to the user. Further, the priority decision unit may decide the degree of importance based on the achievement or the years of experience of the user, for example. That is, in the priority decision unit, the higher the achievement of the user or the longer the years of experience of the user, the higher priority is assigned to the user. Here, in this embodiment, the degree of importance of the users is set on a user inputting screen shown in FIG. 8.

The method which uses "physical distance" is a method which decides priority based on a geographical distance between the conference control device 2 and the video conference terminal device 3. In this method, in the priority decision unit, for example, the larger the distance between the conference control device 2 and the video conference terminal device 3, the higher priority is assigned to the video conference terminal device 3. Then, the communication processing unit sets the order of transmission of conference information from the video conference terminal devices 3 such that the video conference terminal device 3 to which high priority is assigned can transmit the conference information earlier.

The bandwidth control unit, as described previously, when the group having the use band less than the predetermined value is detected by the band monitoring unit, controls the bandwidths of the video conference terminal devices 3 which belong to the group. The bandwidth control unit performs a control of bandwidths corresponding to priority stored in the priority memory unit or priority decided by the priority decision unit, for example. Then, the bandwidth control unit performs a control such that the larger bandwidth is assigned to (a larger transmission amount of information per unit time is given to) the video conference terminal device 3 to which higher priority is assigned than the video conference terminal device 3 to which low priority is assigned.

For example, assume that priority is set as follows in the video conference terminal devices 3a, 3b, 3c which belong to the group A shown in FIG. 1.

(1) In the priority decision file 210, high priority is assigned to the video conference terminal devices 3a, and low priority is assigned to the video conference terminal devices 3b, 3c.

(2) A rate of allocated bandwidths is set such that 50% of the use band is allocated to the video conference terminal device 3a, and 25% of the use band is allocated to the video conference terminal devices 3b, 3c respectively.

(3) The predetermined value of 3 Mbps is set in the use band setting file 209.

Here, assume a case where the use band of the group A is 2.4 Mbps as a result of monitoring by the band monitoring unit. In this case, the bandwidth of 1.2 Mbps is allocated to the video conference terminal device 3a, and the bandwidth of 0.6 Mbps is allocated to the video conference terminal devices 3b, 3c respectively. That is, the bandwidth control unit transmits control signals to the video conference terminal devices 3a, 3b, 3c to perform a control such that the conference information is transmitted from the video conference terminal devices 3a, 3b, 3c respectively with the bandwidths of 1.2 Mbps, 0.6 Mbps, 0.6 Mbps. Accordingly, the conference information is transmitted from the video conference terminal devices 3a, 3b, 3c with the bandwidths of 1.2 Mbps, 0.6 Mbps, 0.6 Mbps.

Further, the bandwidth control unit allocates the larger bandwidth to the information to which high priority is assigned by the priority setting unit, for example. The bandwidth control unit, when the priority is assigned in the descending order to the voice information, the data information and the image information, the bandwidth is also allocated in the descending order to the bandwidth of the voice information, the bandwidth of data information and the bandwidth of image information, for example.

Further, the bandwidth control unit can perform a control of the bandwidths such that the control of the bandwidth is performed by changing a compression rate of conference information. Here, in the video conference terminal device 3, a compression rate of conference information transmitted corresponding to the bandwidths allocated so as to control the bandwidths is changed. As a method of controlling the bandwidths, besides a method which compresses information amount, it is also possible to adopt a method which changes kinds of conference information corresponding to bandwidths. The bandwidth control unit changes a kind of conference information from image information which requires a large bandwidth to voice information which requires a small bandwidth, for example.

Further, as the method of controlling the bandwidth, it may be possible to adopt a method which stops the transmission of conference information to the video conference terminal device 3 to which low priority is assigned. In this method, the bandwidth control unit does not assign the bandwidth to the video conference terminal device 3 to which low priority is assigned, and can allocate the bandwidth of the video conference terminal device 3 to which low priority is assigned to the video conference terminal device 3 to which high priority is assigned. Accordingly, the bandwidth control unit can allocate the larger bandwidth to the video conference terminal device 3 to which high priority is assigned.

The priority setting unit sets priority corresponding to kinds of information contained in the conference information. To be more specific, the priority setting unit, when the bandwidth is controlled by the bandwidth control unit so that the small bandwidth is allocated, sets a kind of information to be transmitted or received in priority. The priority setting unit sets higher priority in order of voice information, data information and image information when the voice information, the data information and the image information are requested to be transmitted or received in this order in priority, for example.

The determination unit determines which device is the video conference terminal device 3 of the user whose speech amount is large based on voice information obtained from the respective video conference terminal devices 3 by the communication processing unit. The determination unit, for example, calculates the speech amount by smoothing a sound level contained in the voice information, and makes the determination based on the speech amount.

Here, the conference setting inputting screen and the user information inputting screen are explained. Firstly, the user information inputting screen is explained in conjunction with FIG. 8.

[User Information Inputting Screen]

The user information inputting screen is a screen for setting usages or the degree of importance of users of the video conference terminal devices 3 which participate in the conference. On the user information inputting screen, for example, an item "usages of terminal" and an item "degree of importance of users" are arranged. Further, the item "degree of importance of user" further includes small items consisting of "position", "achievement" and "years of experience". The item "usages of terminal" is an item in which usages of the video conference terminal devices 3 is inputted.

In the item "usage of terminal", for example, check boxes consisting of "speaker" and "listener" are provided. "Speaker" implies that the own device is a terminal on a speaker side, and "listener" implies that the own device is a terminal on a listener side.

As described above, in the item "degree of importance of user", the items consisting of "position", "achievement" and "years of experience" are provided. The item "position" is an item to which a position of the user is inputted. In this item "position", for example, check boxes consisting of "president", "manager", "section manager" and "ordinary staff" are provided. When a plurality of users use one video conference terminal device 3, the position of the user having the highest position may be inputted to the item "position".

The item "achievement" is an item to which the achievement in business of the user is inputted. In the item "achievement", for example, check boxes consisting of "achievement A", "achievement B" and "achievement C" are provided. "Achievement A", "achievement B" and "achievement C" are evaluation information which are set additionally and evaluate the user. Here, the achievement is elevated in order of the achievement C→the achievement B→the achievement A.

The item "years of experience" is an item to which years of experience of the user is inputted. In this item "years of experience", for example, check boxes consisting of "20 years or more", "10 years or more and less than 20 years", "5 years or more and less than 10 years", and "less than 5 years" are provided.

[Conference Setting Inputting Screen]

Following the explanation of the user information inputting screen made above, the conference setting inputting screen is explained hereinafter in conjunction with FIG. 9. The conference setting inputting screen is a screen for setting the whole conference. On the conference setting inputting screen, for example, items consisting of "decision of priority", "setting of priority" and "grouping method" are arranged.

The item "decision of priority" is an item which decides the reference necessary for deciding priority among the video conference terminal devices 3. In the item "decision of priority", for example, check boxes consisting of "speech amount", "usage of terminal", "degree of importance of user" and "physical distance" are provided. The user can select any one of these check boxes. Further, the user can select a plurality of check boxes out of these check boxes. When the user selects the plurality of check boxes, the priority decision unit performs weighting of priority for every check box, and the final priority is decided based on such weighting. When priority is decided based on "speech amount" and "degree of importance of user", for example, weighting which regards "speech amount" more important than "degree of importance of user" is made. Then, the priority decision unit firstly makes a decision to assign high priority to the video conference terminal device 3 whose "speech amount" is large. Then, the priority decision unit decides priority corresponding to "degree of importance of user" when "speech amounts" of the respective video conference terminal devices 3 are equal.

The item "setting of priority" is an item which selects whether or not a bandwidth is to be reallocated corresponding to a kind of conference information transmitted or received between the conference control device 2 and the video conference terminal device 3. In this item, "setting of priority", for example, check boxes consisting of "set" and "not set" are provided, for example. Here, when the user selects "set", the bandwidth control unit looks up the priority setting file 211. Then, the bandwidth control unit allocates a large bandwidth to information of a kind to which high priority is assigned compared to the information of a kind to which low priority is assigned.

The item "grouping method" is an item for deciding a sorting method for sorting the video conference terminal devices 3 into a plurality of groups. In the item "grouping method", check boxes consisting of "degree of agreement of connection paths", "same router" and "domain" are provided. The user can select any one of these check boxes.

[Control Processing]

Figure 10B:
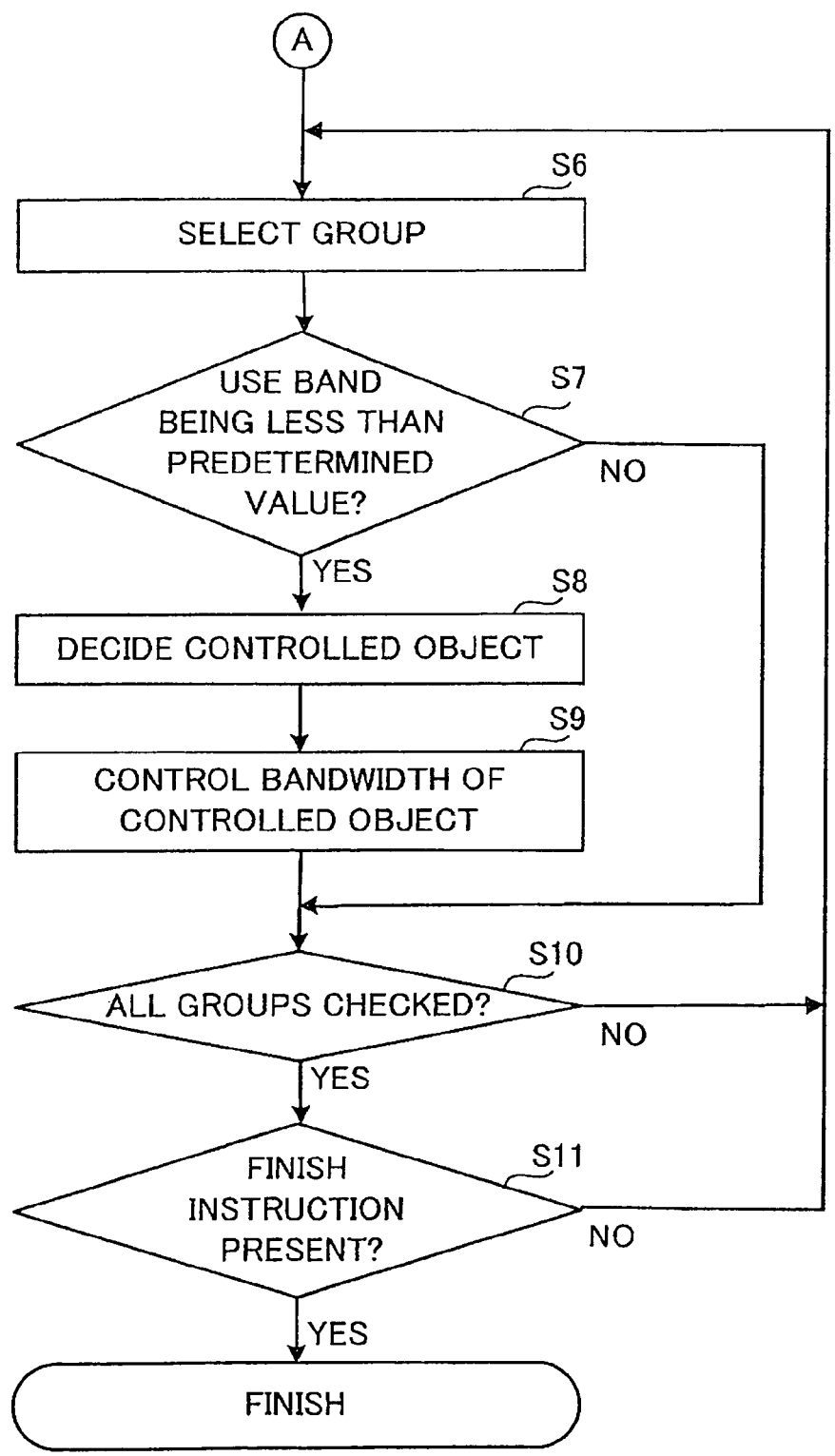
FIG. 10B is a flowchart showing one example of the main processing in the conference control device according to the first embodiment of the present invention.

Next, in conjunction with FIG. 10A and FIG. 10B, the explanation is made hereinafter with respect to control processing which the CPU 202 of the conference control device 2 of the video conference system 1 according to the first embodiment of the present invention performs. The CPU performs such control processing by reading the conference control program stored in the first memory part 203.

[Main Processing]

Firstly, when the power source of the conference control device 2 is turned on, the CPU 202 executes an initial setting operation such as permission of access to the first memory part 203 and the second memory part 204 and securing and initializing of a working area. The CPU 202 brings the conference control program 207 into an executable state by the CPU 202 and performs a function as the control part 206.

Next, as shown in FIG. 10A, the CPU 202 performs the connection processing for connecting the conference control device 2 with the video conference terminal devices 3 which participate in the conference (step S1). The connection processing is performed such that the CPU 202 transmits a response signal to the video conference terminal device 3 which transmits a connection request signal and establishes a session with the video conference terminal device 3.

Next, the CPU 202 prompts setting of the conference (step S2). To be more specific, the CPU 202 instructs a built-in display (not shown in the drawing) of the video conference terminal device 3 which requests the conference connection to display the above-mentioned user information inputting screen (see FIG. 8) or conference setting inputting screen (see FIG. 9). As a result, the user inputting screen and the conference setting inputting screen are displayed on the built-in display of the video conference terminal device 3 which requests the conference connection first. Subsequently, the user information inputting screen is displayed on the built-in display of the video conference terminal device 3 which requests the conference connection secondly and in accordance with orders which come thereafter. The user of the video conference terminal device 3 puts a check mark in any one of the plurality of check boxes provided for respective items on the conference setting inputting screen or the like by operating the video conference terminal device 3 and, thereafter, clicks a "setting" button switch thus inputting the conference setting information and the user information whereby the conference setting is performed. The conference setting information and the user information inputted on the conference setting inputting screen or the like are transmitted to the conference control device 2 and are stored in the second memory part 204 of the conference control device 2.

Next, the CPU 202 collects terminal information of the respective video conference terminal devices 3 and information on the connection paths of the respective video conference terminal devices 3 (step S3). To be more specific, the CPU 202 collects IP addresses of the respective video conference terminal devices 3 transmitted from the video conference terminal devices 3 as the terminal information. Then, the CPU 202 executes the above-mentioned "traceroute" method based on the collected IP addresses so as to collect the IP addresses of the routers 4 as the information on the connection paths.

Next, the CPU 202 executes grouping of the video conference terminal devices 3 (step S4). For example, the CPU 202 executes grouping which sorts the video conference terminal devices 3a, 3b, 3c into the same group as shown in FIG. 1 by the above-mentioned "degree of agreement of the connection paths" method. When the grouping processing is finished as described above, in the conference control device 2, a group list is generated and is stored in the second memory part 204.

Next, the CPU 202 monitors the use bands of the respective video conference terminal devices 3 (step S5). The CPU 202 determines, sequentially in accordance with every group, whether or not the bandwidths of the video conference terminal devices 3 which belong to the group are to be controlled. First, as shown in FIG. 10B, the CPU 202 selects a group for performing the above-mentioned determination (step S6). To be more specific, the CPU 202 looks up the group list. The CPU 202 selects any one group out of groups in which a set value of the selection processing flag is set to "0". When this processing is finished, the CPU 202 changes the set value of the selection processing flag of the selected group from "0" to "1".

Next, the CPU 202 determines whether or not the use band of the selected group is less than a predetermined value based on the use band of the video conference terminal device 3 monitored in step S5 (step S7). When the CPU 202 determines that the use band of the selected group is less than the predetermined value (step S7: YES), the CPU 202 advances the processing to step S8. On the other hand, when the CPU 202 determines that the use band of the selected group is not less than the predetermined value (step S7: NO), the CPU 202 advances the processing to step S10 described later.

Next, the CPU 202 decides the video conference terminal device 3 which becomes a controlled object (step S8). To be more specific, the CPU 202 looks up the group list and changes the set values of control processing flags of the respective video conference terminal devices 3 which belong to the group whose use band is determined to be less than the predetermined value in step S7 from "0" to "1". For example, when the respective video conference terminal devices 3 in the group A shown in FIG. 1 become the controlled objects, the CPU 202 changes the set values of the respective control processing flags of the video conference terminal devices 3a, 3b, 3c from "0" to "1".

Next, the CPU 202 controls the bandwidth of the controlled object (step S9). To be more specific, the CPU 202 looks up the group list and reallocates the bandwidth corresponding to the priority described in the priority decision file 210 or the priority setting file 211 and the ratio of the bandwidth to the video conference terminal device 3 whose set value of an object setting flag is set to "1". When this processing is finished, the CPU 202 changes the set value of the object setting flag from "1" to "0".

Next, the CPU 202 determines whether or not all groups are checked (step S10). To be more specific, the CPU 202 looks up the group list and determines whether or not the group whose set value of the selection processing flag is set to "0" is present. When the CPU 202 determines that all groups are checked (step S10: YES), the CPU 202 changes the set values of the selection processing flags of all groups from "1" to "0". Thereafter, the CPU 202 advances the processing to step S11. On the other hand, when the CPU 202 determines that all groups are not checked (step S10: NO), the CPU 202 returns the processing to step S6.

Next, the CPU 202 determines whether or not the finish instruction is present (step S11). When the CPU 202 determines that the finish instruction is present (step S11: YES), the CPU 202 finishes the main processing. On the other hand, when the CPU 202 determines that the finish instruction is not present (step S11: NO), the CPU 202 returns the processing to step S6.

As described above, the conference control device 2 of the video conference system 1 of this embodiment includes the control part 206 which functions as the information collecting unit and the grouping unit. Accordingly, the conference control system 2 can collect the connection paths between the conference control device 2 and the video conference terminal devices 3 using the information collecting unit and can sort the video conference terminal devices 3 into a plurality of groups based on information on the connection paths, for example, based on positions or physical connection such as connection with the same network, using the grouping unit.

Further, in the conference control device 2 of this embodiment, the control part 206 also functions as the band monitoring unit and the bandwidth control unit. Accordingly, the conference control device 2 can perform the bandwidth control in which the respective video conference terminal devices 3 which belong to a group whose use band is less than a predetermined value become the controlled objects and hence, it is possible to effectively allocate a bandwidth to the desired video conference terminal device 3.

Here, with respect to a video conference system, there has been known a method which applies a bandwidth control (reallocation of bandwidths) to all video conference terminal devices 3 which participate in the video conference. In this method, as explained previously, the bandwidth control is performed with respect to all video conference terminal devices 3 which participate in the video conference. Accordingly, when a change of a use band takes place in a partial range of the network, the bandwidth of the video conference terminal device 3 which is arranged remote from such a partial range of the network and does not require the bandwidth control originally is also controlled. Accordingly, in the conventional video conference system, there may be a case where a bandwidth which exceeds a necessary bandwidth of the video conference terminal device 3 which does not require the bandwidth control originally is allocated to such a video conference terminal device 3, and a sufficiently large bandwidth is not allocated to the video conference terminal device 3 to which high priority is assigned.

To the contrary, according to the conference control device 2 of the video conference system 1 of this embodiment, the plurality of video conference terminal devices 3 are sorted into groups based on the physical connection, and the bandwidth is controlled in accordance with every group. Accordingly, the conference control device 2 can effectively perform the bandwidth control to cope with a change of a use band generated in a partial range of the network.

In the conference control device 2 of the video conference system 1 of this embodiment, the control part 206 also functions as the priority storing unit and can store priority. Accordingly, the conference control device 2 can allocate a small bandwidth to the video conference terminal device 3 to which low priority is assigned compared to the video conference terminal device 3 to which high priority is assigned.

In the conference control device 2 of the video conference system 1 of this embodiment, the control part 206 also functions as the priority decision unit. That is, the conference control device 2 detects speech amounts of users based on voice information acquired from the respective video conference terminal devices 3, decides the priority based on the speech amounts, and controls the bandwidths based on the priority. Accordingly, the conference control device 2 can allocate a large bandwidth to the video conference terminal device 3 where the user whose speech amount is large is present.

In the conference control device 2 of the video conference system 1 of this embodiment, the control part 206 functions as the priority decision unit and decides the priority based on information on usages of the terminals contained in the conference information. Then, the conference control device 2 controls the bandwidths corresponding to priority based on the information on usages. Accordingly, the conference control device 2 can allocate a large bandwidth to the video conference terminal device 3 where a speaker is present, for example.

In the conference control device 2 of the video conference system 1 of this embodiment, the control part 206 functions as the priority decision unit and decides the priority based on information on the degrees of importance of users contained in the conference information. Then, the conference control device 2 controls the bandwidths corresponding to priority based on the information on the degrees of importance of users. Accordingly, the conference control device 2 can allocate a large bandwidth to the video conference terminal device 3 where a speaker is present, for example.

In the conference control device 2 of the video conference system 1 of this embodiment, the control part 206 functions as the information collecting unit, and sequentially transmits packets to the respective video conference terminal devices 3 while increasing a value of TTLs. Then, the conference control device 2 detects IP addresses of routers as information of connection paths based on response packets transmitted from the routers when the TTLs of the packets are 0. Accordingly, the conference control device 2 can perform grouping based on the IP addresses of the routers.

Although the present invention has been explained by taking the first embodiment as an example, the present invention is not limited to such an embodiment and various modifications are conceivable.

In this embodiment, the control part 206 monitors use bands for determining whether or not the bandwidths are to be controlled. However, the control part 206 may determine whether or not the bandwidth is to be controlled based on, for example, "delay time of information packet", "arrival interval of information packet" or "difference between previous arrival interval of information packet and this-time arrival interval of information packet" for transmitting the conference information.

In determining the whether or not the bandwidths are to be controlled based on the "delay time of information packet", the control part 206 calculates the transfer time of a packet from the video conference terminal device 3 to the conference control device 2 based on a time stamp contained in the conference information, for example. Then, the control part 206 determines that the bandwidth is to be controlled when the transfer time of the information packet becomes a predetermined time or more.

In determining whether or not the bandwidths are to be controlled based on the "arrival interval of information packet", the control part 206 calculates the arrival interval of information packet which is sequentially transmitted based on a time stamp contained in the conference information, for example. Then, the control part 206 determines that the bandwidth is to be controlled when the arrival interval of the information packet becomes a predetermined time or more.

[Regrouping]

Figure 11:
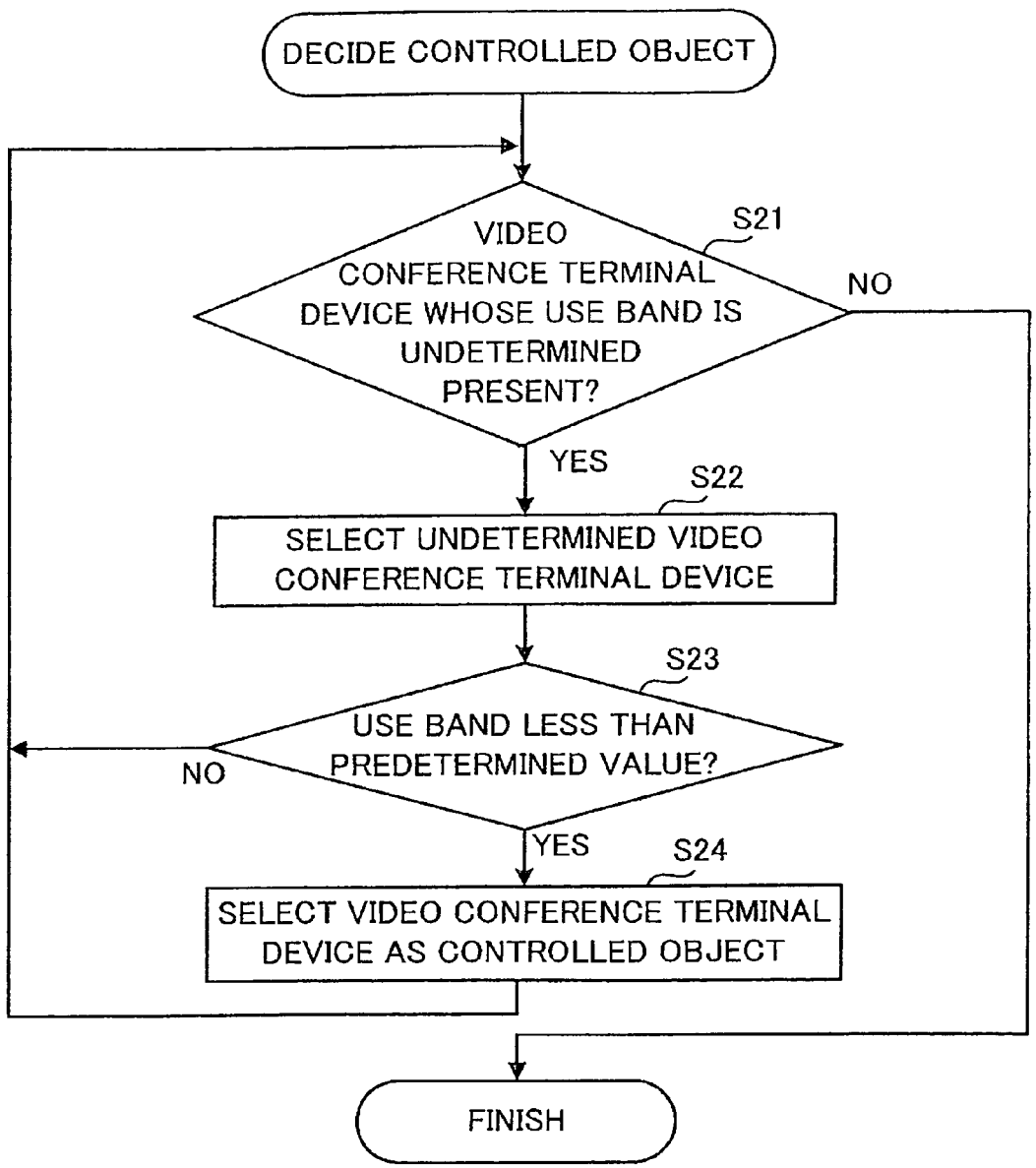
FIG. 11 is a flowchart showing controlled object decision processing by regrouping in the conference control device according to the first embodiment of the present invention.

The conference control device 2 according to this embodiment is, as described above, configured to select a controlled object by performing regrouping which performs grouping more finely within a group formed by temporarily performing grouping. FIG. 11 shows processing "decide controlled object" in step S8 shown in FIG. 10B.

As shown in FIG. 11, the CPU 202 determines whether or not a video conference terminal device whose use band is undetermined is present (step S21). To be more specific, the CPU 202 looks into the group list and determines whether or not the video conference terminal device 3 whose set value of the selection processing flag is "0" is present in the group whose use band is determined to be less than the predetermined value in step S7. When the CPU 202 determines that such a terminal is present (step S21: YES), the CPU 202 advances the processing to step S22. On the other hand, when the CPU 202 determines that such a terminal is not present (step S21: NO), the CPU 202 finishes the controlled object decision processing.

Next, the CPU 202 selects the undetermined video conference terminal device 3 (step S22). To be more specific, the CPU 202, looking up the group list, selects any one of the video conference terminal devices 3 whose set value of the selection processing flag is set to "0". When this processing is finished, the CPU 202 changes the set value of the selection processing flag of the selected video conference terminal device 3 from "0" to "1".

Next, the CPU 202 determines whether or not the use band is less than a predetermined value (step S23). To be more specific, the CPU 202 looks up the use band setting file 209, and determines whether or not the use band of the selected video conference terminal device 3 is less than a predetermined value, set in the video conference terminal device 3. Then, when the CPU 202 determines that the use band is less than the predetermined value (step S23: YES), the CPU 202 advances the processing to step S24. On the other hand, when the CPU 202 determines that the use band is not less than the predetermined value (step S23: NO), the CPU 202 returns the processing to step S21.

Next, in step S24, the CPU 202 designates the video conference terminal device 3 whose use band is determined to be less than the predetermined value as a controlled object. To be more specific, the CPU 202 looks up the group list. Then, the CPU 202 changes a set value of an object setting flag of the video conference terminal device 3 whose use band is determined to be less than the predetermined value in step S23 from "0" to "1". When this processing is finished, the CPU 202 returns the processing to step S21.

By executing the above-mentioned processing, the video conference terminal devices 3 are regrouped. For example, in performing regrouping within the group A, the CPU 202 executes the processing in steps S21 to S24 with respect to the video conference terminal devices 3a, 3b, 3C which belong to the group A respectively. Then, if the CPU 202 determines that the use bands of the video conference terminal devices 3b, 3c are less than the predetermined value, the video conference terminal devices 3b, 3c are sorted into the same group so that regrouping is executed.

As described above, in this application example, the CPU 202 regroups the video conference terminal devices whose use bands are reduced within a group, and controls the bandwidths of the regrouped video conference terminal devices 3. Accordingly, the CPU 202 can more effectively control the bandwidths of the group than controlling the bandwidths of the respective video conference terminal devices 3 within the group. For example, this application example is preferably applicable to a case where the use bands of the video conference terminal devices 3 which belong to the same group are not uniformly changed so that grouping is not sufficient or a case where the method of changing the use bands of the video conference terminal devices 3 which belong to the same group differ from each other.

Second Embodiment

Next, the video conference system according to the second embodiment of the present invention is explained. The video conference system of this embodiment is a so-called P2P-type video conference system which is constituted of a plurality of video conference terminal devices, and the transmission/reception of conference information or the like are performed between the respective video conference terminal devices. In this video conference system, each video conference terminal device decides a content of a bandwidth control and controls a bandwidth.

Figure 12:
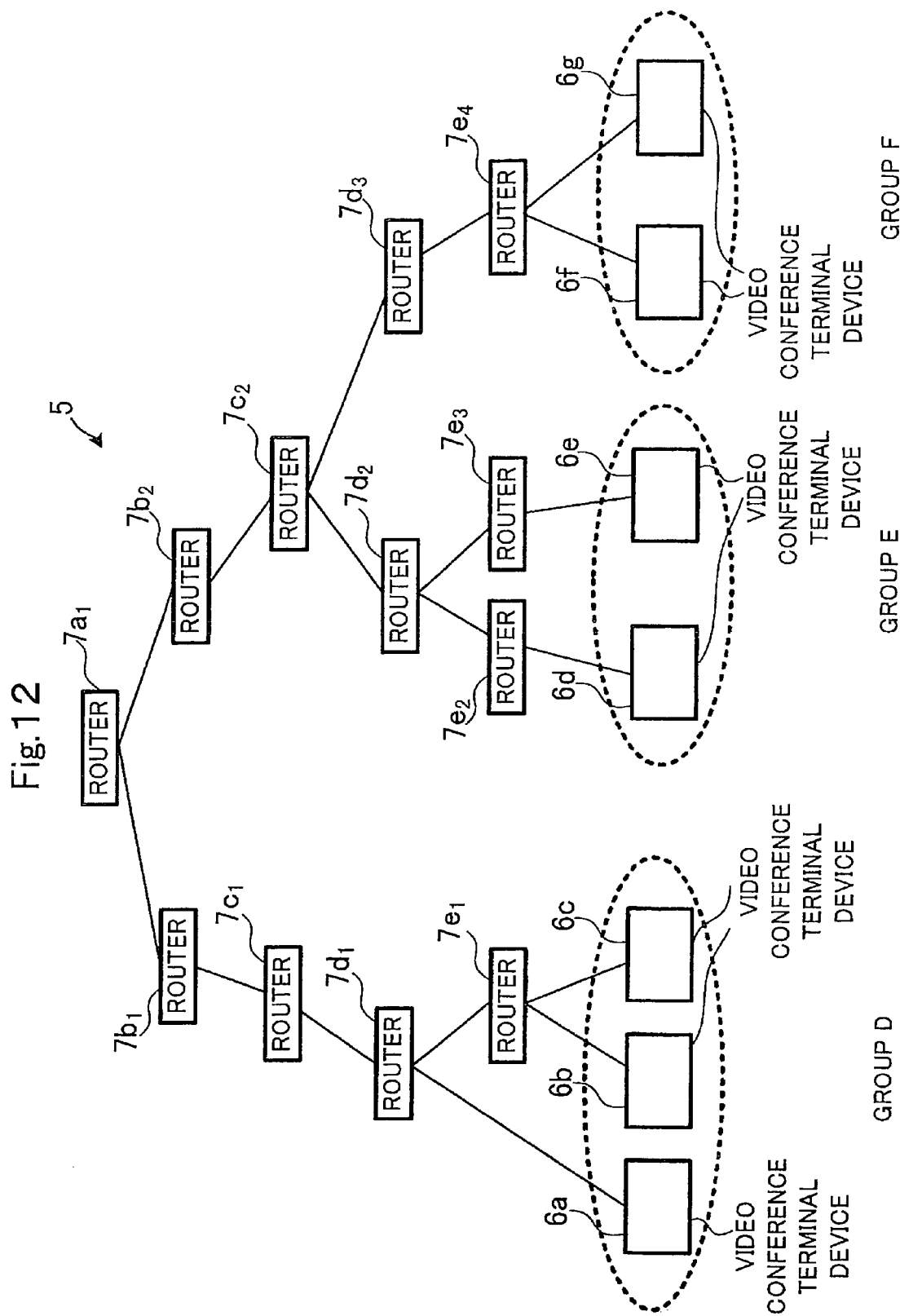
FIG. 12 is a view showing the schematic constitution of a video conference system according to a second embodiment of the present invention.

As shown in FIG. 12, the video conference system 5 is constituted of a plurality of video conference terminal devices 6. The video conference terminal devices 6 are connected with each other through an IP network such as the Internet on which a plurality of routers 7a to 7d are arranged. In the video conference system 5, the video conference is held in a form that conference information is transmitted and received between the video conference terminal devices 6a to 6g.

Further, in the video conference system 5, grouping processing, use band monitoring processing and bandwidth controlling processing which are characteristic processing of this embodiment are performed. Hereinafter, these characteristic processing are explained in conjunction with drawings. With respect to the characteristic processing, a main device is set in accordance with every group of the video conference terminal devices 6. The characteristic processing are performed by the main devices. The video conference terminal device 6a is adopted as one of main devices in this embodiment, and the explanation is made hereinafter with respect to this video conference terminal device 6a.

Figure 13:
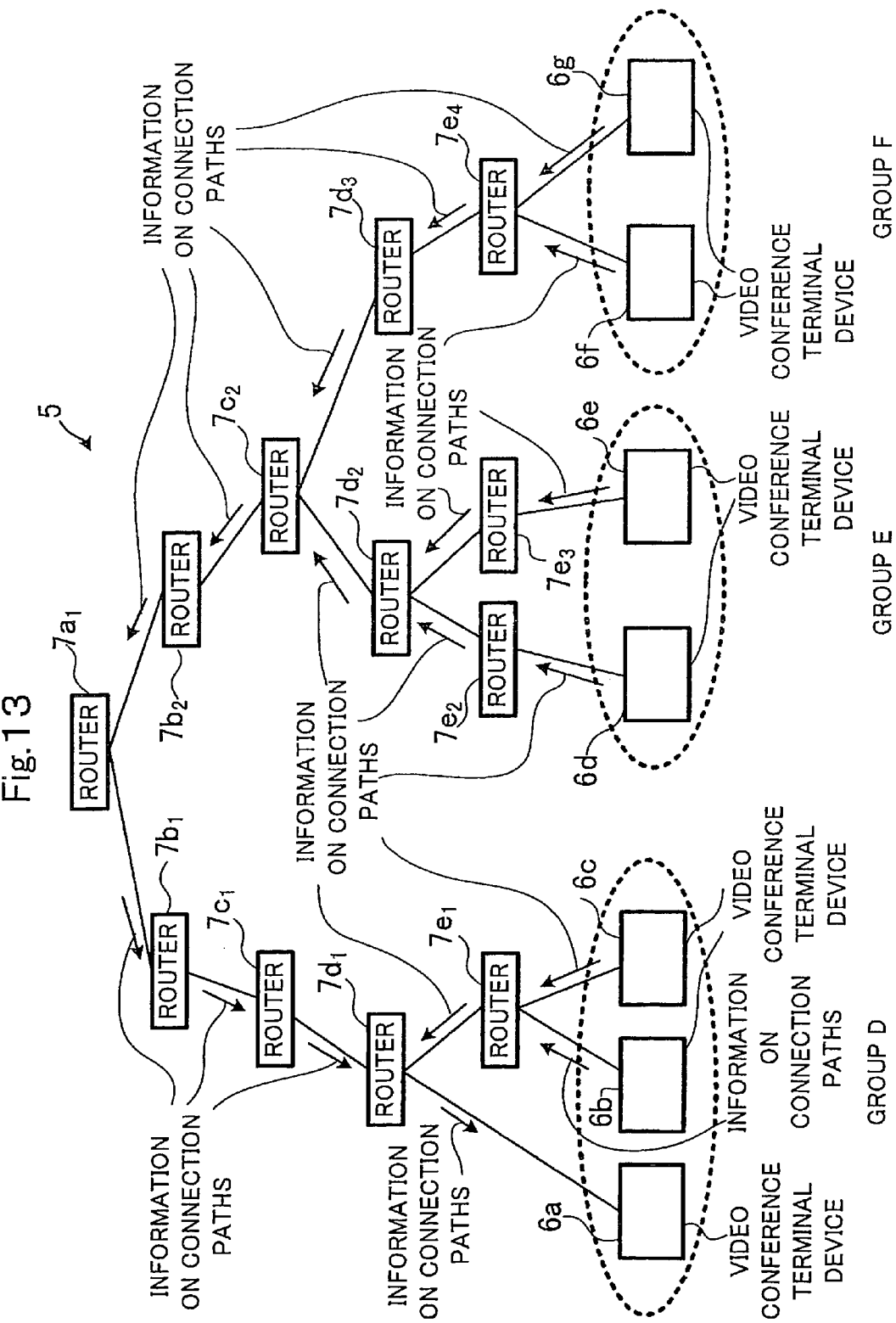
FIG. 13 is a view showing an operation of the video conference system according to the second embodiment of the present invention.

As shown in FIG. 13, in the video conference system 5, the video conference terminal device 6a collects information on connection paths between the video conference terminal device 6a and the video conference terminal devices 6b to 6g which constitute communication partners. In the video conference system 5, as the information on the connection paths, IP addresses of routers $7a_1$ to $7d_1$ which are arranged between the video conference terminal device 6a and the video conference terminal devices 6b to 6g which constitute communication partners are collected. To be more specific, in the video conference system 5, as the information on the connection path between the video conference terminal device 6a and the video conference terminal device 6c, the IP addresses of the routers $7d_1$, $7e_1$ are collected.

Figure 14:
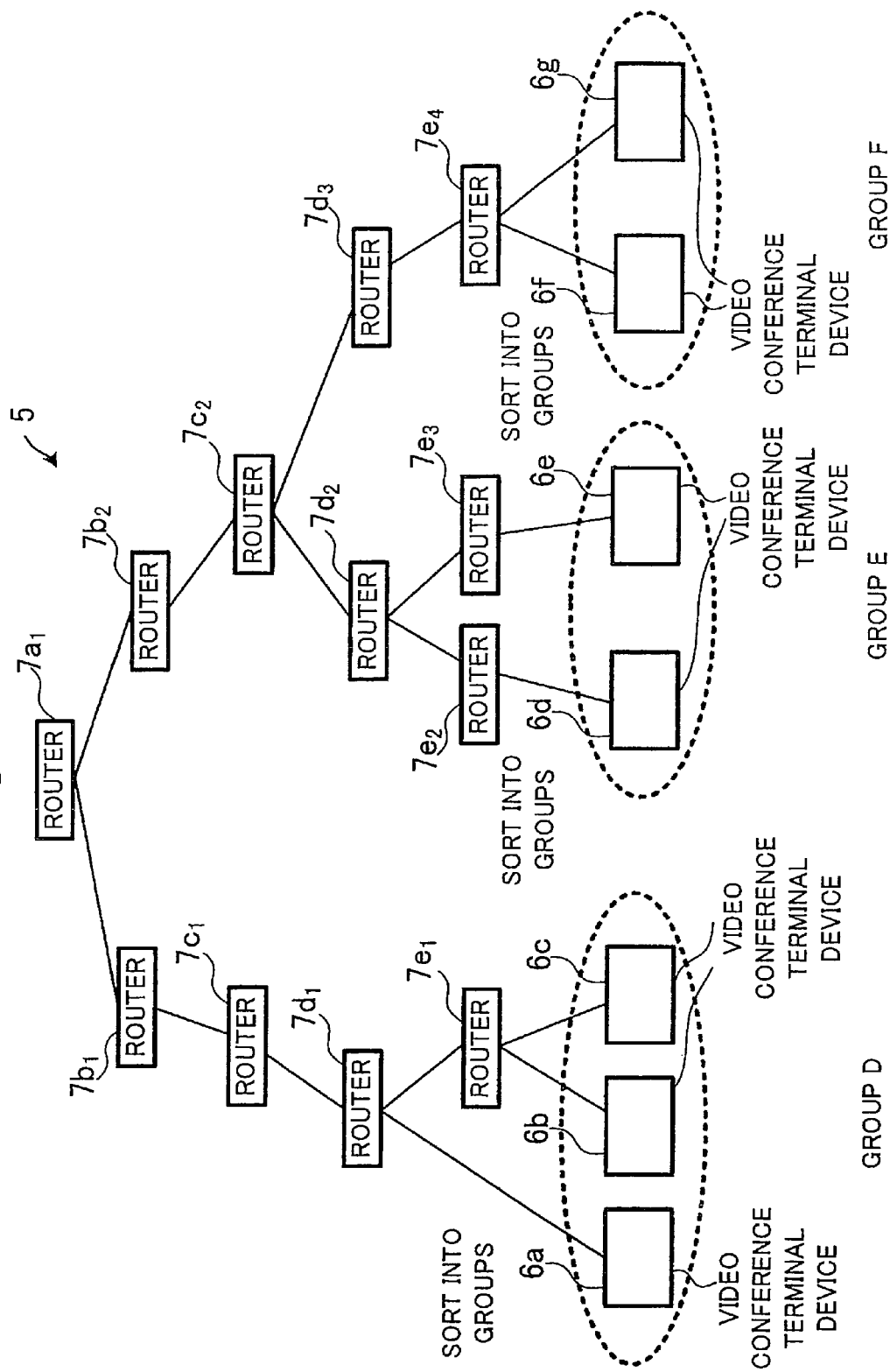
FIG. 14 is a view showing an operation of the video conference system which follows the operation shown in FIG. 13.

As shown in FIG. 14, after collecting the information on the connection paths, the video conference terminal device 6a decides the video conference terminal devices to be sorted into the same group as the own device (the video conference terminal device 6a) based on the collected information on the connection paths. For example, the video conference terminal device 6a is sorted into the same group as the video conference terminal devices 6 which constitute communication partners arranged in the vicinity of the video conference terminal device 6a based on the degree of agreement of the connection paths. That is, the video conference terminal device 6a is sorted into the group D together with the video conference terminal devices 6b, 6c.

Figure 15:
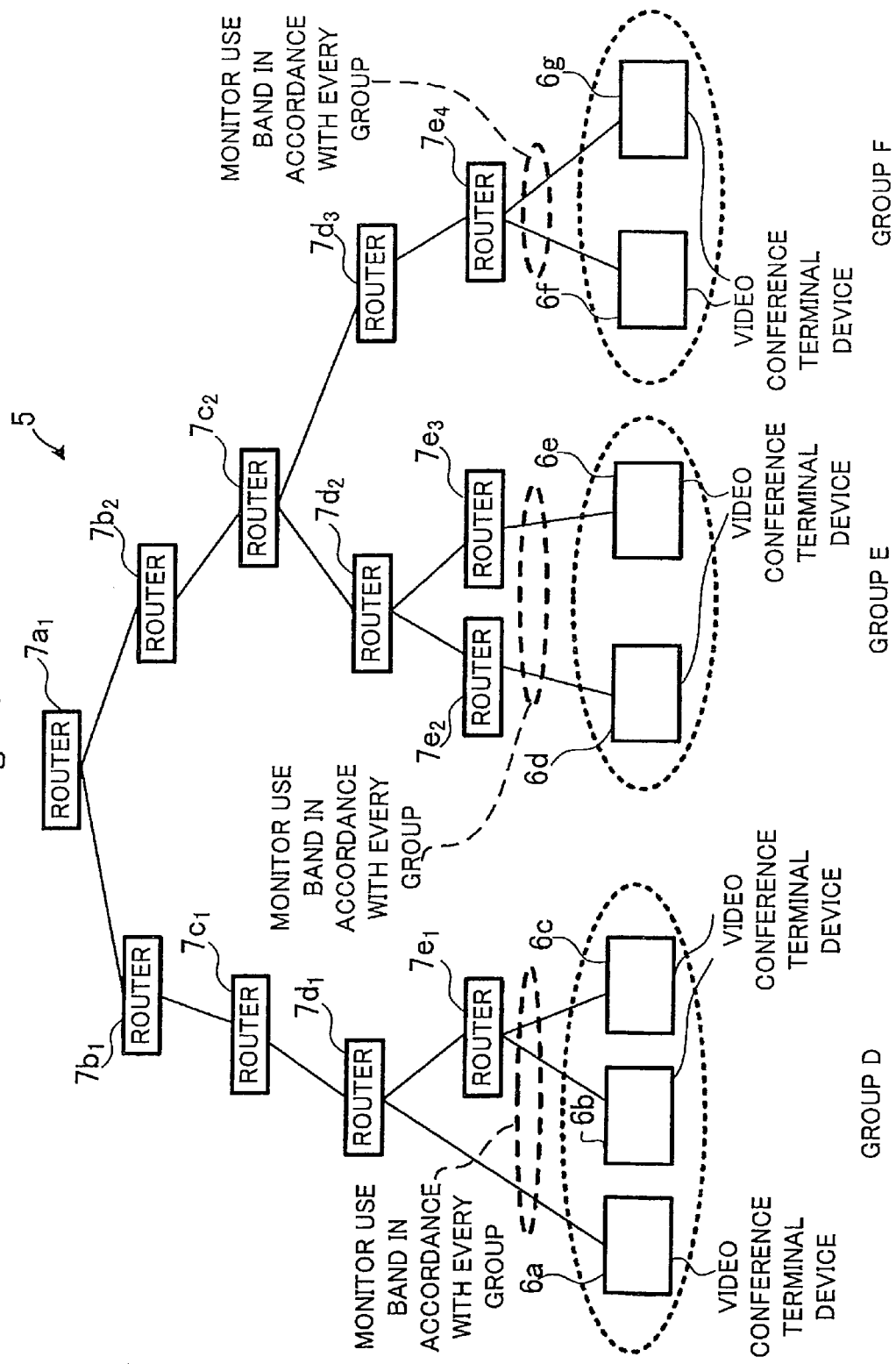
FIG. 15 is a view showing an operation of the video conference system which follows the operation shown in FIG. 14.

As shown in FIG. 15, the video conference terminal device 6a monitors use band which constitute communication partners in the group to which the own device belongs. To be more specific, in monitoring the use band of the group D, the video conference terminal device 6a detects the use band of the own device and the use bands of the video conference terminal devices 6b, 6c which belong to the group D respectively. Then, the video conference terminal device 6a calculates the use band of the group D by putting the use bands of the respective video conference terminal devices 6a, 6b, 6c together. Here, in monitoring the use band, the video conference terminal device 6a also determines whether or not the use band in accordance with every group which is the result of monitoring is less than a preset predetermined value.

Figure 16:
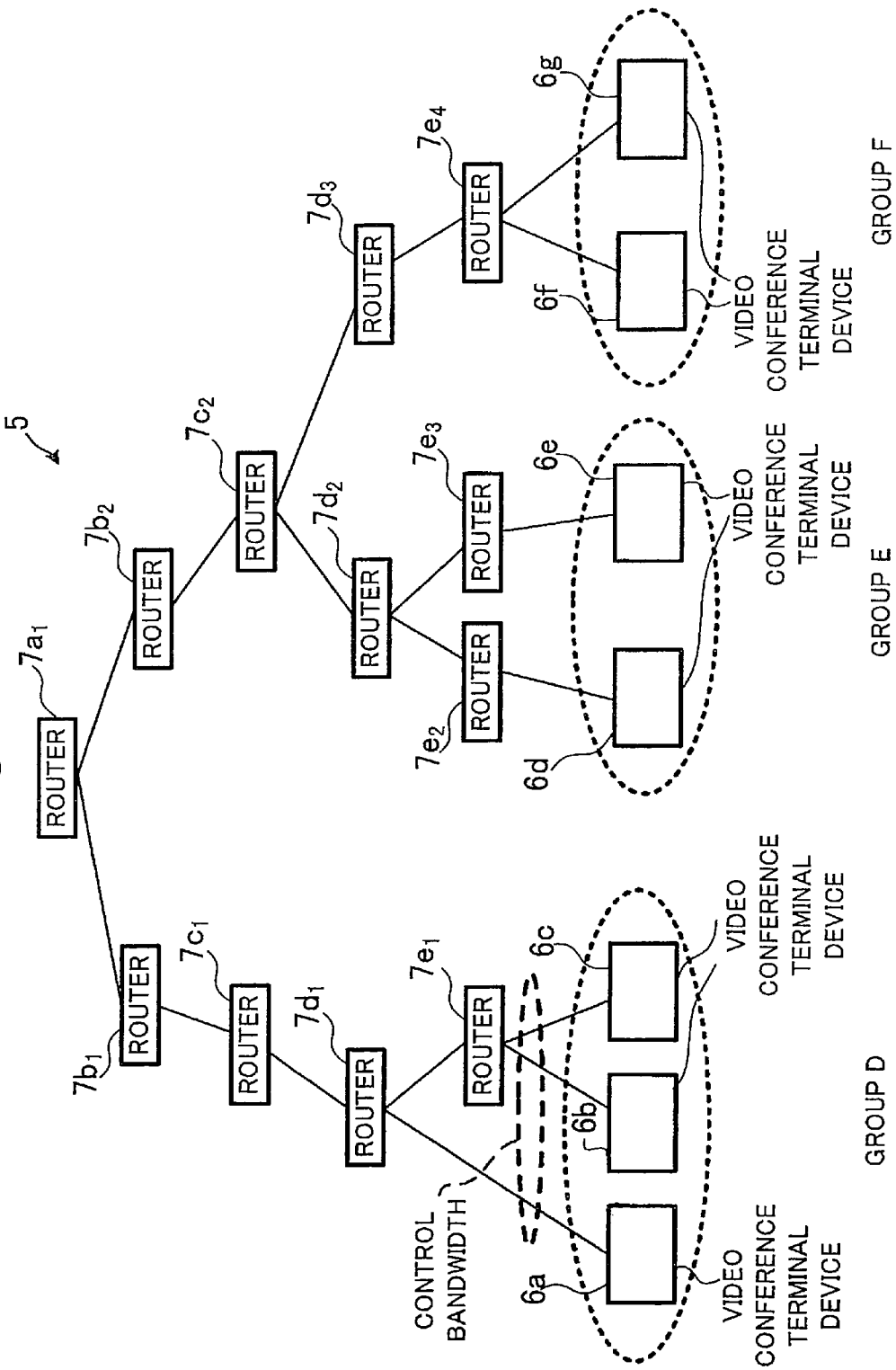
FIG. 16 is a view showing an operation of the video conference system which follows the operation shown in FIG. 15.

As shown in FIG. 16, when the use band of the group D to which the video conference terminal device 6a belongs is less than the predetermined value, the video conference terminal device 6a controls the bandwidths of the video conference terminal devices 6a, 6b, 6c which belong to the group D. Here, the video conference terminal device 6a controls the bandwidth using the same method as the above-mentioned first embodiment (see FIG. 6A to FIG. 6C). In the video conference system 5, for example, when the high priority is assigned to the video conference terminal device 6a and low priority is assigned to the video conference terminal devices 6b, 6c, a large bandwidth is allocated to the video conference terminal device 6a, and a small bandwidth is allocated to the video conference terminal devices 6b, 6c. Due to such a control, in the video conference terminal device 6a to which high priority is assigned, when the use band is changed, a portion of the bandwidth of other video conference terminal devices 6b, 6c in the same group is allocated to the video conference terminal device 6a and hence, the reduction of the bandwidth is alleviated.

As described above, according to the video conference system 5 of this embodiment, it is possible to effectively control the bandwidth corresponding to a congestion state of the network.

That is, in a conventional video conference system, a bandwidth is controlled for every video conference terminal device 6. Accordingly, in a conventional video conference system, the bandwidth can be controlled only corresponding to a change of the use band of the video conference terminal 6. To the contrary, the video conference system 5 of this embodiment can control the bandwidths of the video conference terminal devices 6 within the group in accordance with every group. Accordingly, the video conference system 5 can perform the effective bandwidth control.

For example, in the constitution shown in FIG. 12, when traffic between the routers $7c_1$, $7d_1$ is congested, the use bands of the video conference terminal devices 6a, 6b, 6c become small respectively. In such a case, according to the conventional video conference system, the bandwidths of the respective video conference terminal devices 6a, 6b, 6c are controlled to become small corresponding to the change of the use bands respectively. To the contrary, according to the video conference system 5 of this embodiment, the bandwidths of the video conference terminal devices 6a, 6b, 6c are controlled corresponding to the use band of the whole group consisting of the video conference terminal devices 6a, 6b, 6c instead of the use bands of the video conference terminal devices 6a, 6b, 6c.

Accordingly, for example, the main video conference terminal device 6 which is set in the group sets the priority among the video conference terminal devices 6 in the group. Further, in controlling the bandwidths of the video conference terminal devices 6 in accordance with priority, the main video conference terminal device 6 allocates the large bandwidth to the video conference terminal device 6 to which high priority is assigned, and allocates the small bandwidth to the video conference terminal device 6 to which low priority is assigned. Accordingly, the video conference system 5 can alleviate the reduction of the bandwidth of the video conference terminal device 6 to which high priority is assigned.

The above-mentioned priority decides magnitudes of bandwidths allocated among the video conference terminal devices 6 within the group when the bandwidths are controlled. Accordingly, it is necessary to set this priority among the video conference terminal devices 6 within the same group. Further, in the video conference system 5, the allocation of the bandwidths is performed among the video conference terminal devices 6 within the group sorted based on the information on the connection paths thus alleviating the reduction of the bandwidth of the video conference terminal device 6 to which high priority is assigned. Accordingly, in the video conference system 5, when the video conference terminal devices are sorted into groups, it is desirable to sort a plurality of video conference terminal devices 6 into one group.

[Specific Constitution of Video Conference Terminal Device 6]

Next, the video conference terminal device 6 according to the second embodiment is explained in detail in conjunction with one specific example.

Figure 17:
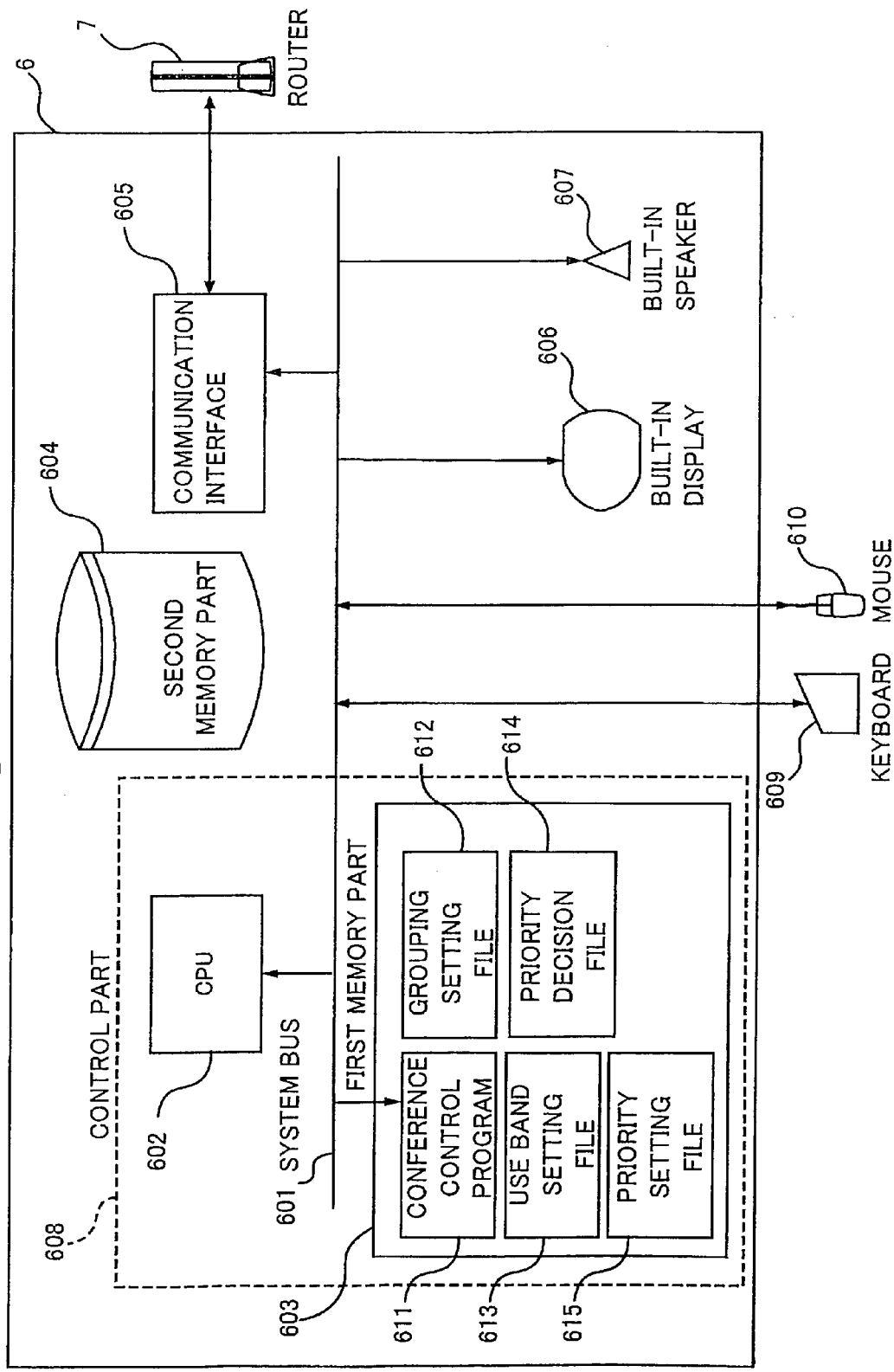
FIG. 17 is a block diagram showing the specific constitution of a video conference terminal device according to the second embodiment of the present invention.

As the video conference terminal device 6, a general personal computer is applicable besides a dedicated computer. As shown in FIG. 17, the video conference terminal device 6 includes a CPU 602, a first memory part 603 which constitutes a rewritable main memory device for storing a conference control program 611, a second memory part 604 which is constituted of an HDD or the like which stores various information and the like, a communication IF 605 which is provided for communication between the own device (the video conference terminal device 6) and the video conference terminal devices 6 which constitute communication partners participating in the network through the routers 7, a built-in display 606 and a built-in speaker 607. These various constitutional components are interconnected with each other via a system bus 601. In this embodiment, a control part 608 is constituted of the CPU 602 and the first memory part 603.

(First Memory Part 603)

The first memory part 603 also stores the conference control program 611 which imparts fundamental functions as a computer to the video conference terminal device 6 and allows the video conference terminal device 6 to function as various units. The conference control program 611 is read by the CPU 602. Then, functions in accordance with the conference control program 611 are executed by the CPU 602. Further, in the first memory part 603, a grouping setting file 612, a use band setting file 613, a priority decision file 614 and a priority setting file 615 are stored. Here, the respective setting files 612 to 615 are substantially equal to the corresponding setting files 208 to 211 in the first embodiment and hence, the explanation of the setting files 612 to 615 is omitted.

The conference control program 611 may be downloaded to the first memory part 603 from a server or the like connected to the network through the communication IF 605, for example. Further, the conference control program 611 may be stored in a recording medium such as a CD-ROM and, thereafter, may be read by the first memory part 603 through a recording medium drive not shown in the drawing.

(Second Memory Part 604)

In the second memory part 604, conference setting information, user information, conference information transmitted from the video conference terminal devices 6, terminal information, information on connection paths, a group list, information on the use bands of the respective video conference terminal devices 6 (hereinafter referred to as "band information"), and a main device setting flag relating to the setting of the main device are stored.

(Control Part 608)

The control part 608 is constituted of the CPU 602 and the first memory part 603 as described above. The control part 608 systematically controls the whole video conference terminal device 6 by allowing the CPU 602 to read the conference control program 611 stored in the first memory part 603 and to execute the conference control program 611. Further the control part 608 also functions as a communication processing unit, an information collecting unit, a grouping unit, a band monitoring unit, a bandwidth control unit, a priority memory unit, a priority decision unit, and a priority setting unit. Here, the respective units are substantially equal to the corresponding units in the above-mentioned first embodiment and hence, the explanation of the) respective units is omitted.

[Control Processing]

Figure 18A:
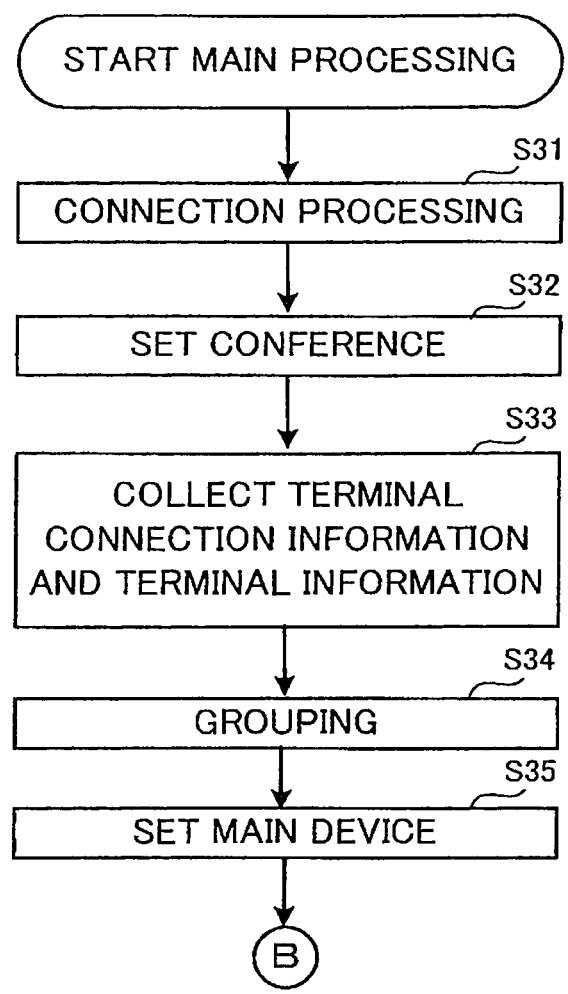
FIG. 18A is a flowchart showing one example of main processing in the video conference terminal device according to the second embodiment of the present invention.
Figure 18B:
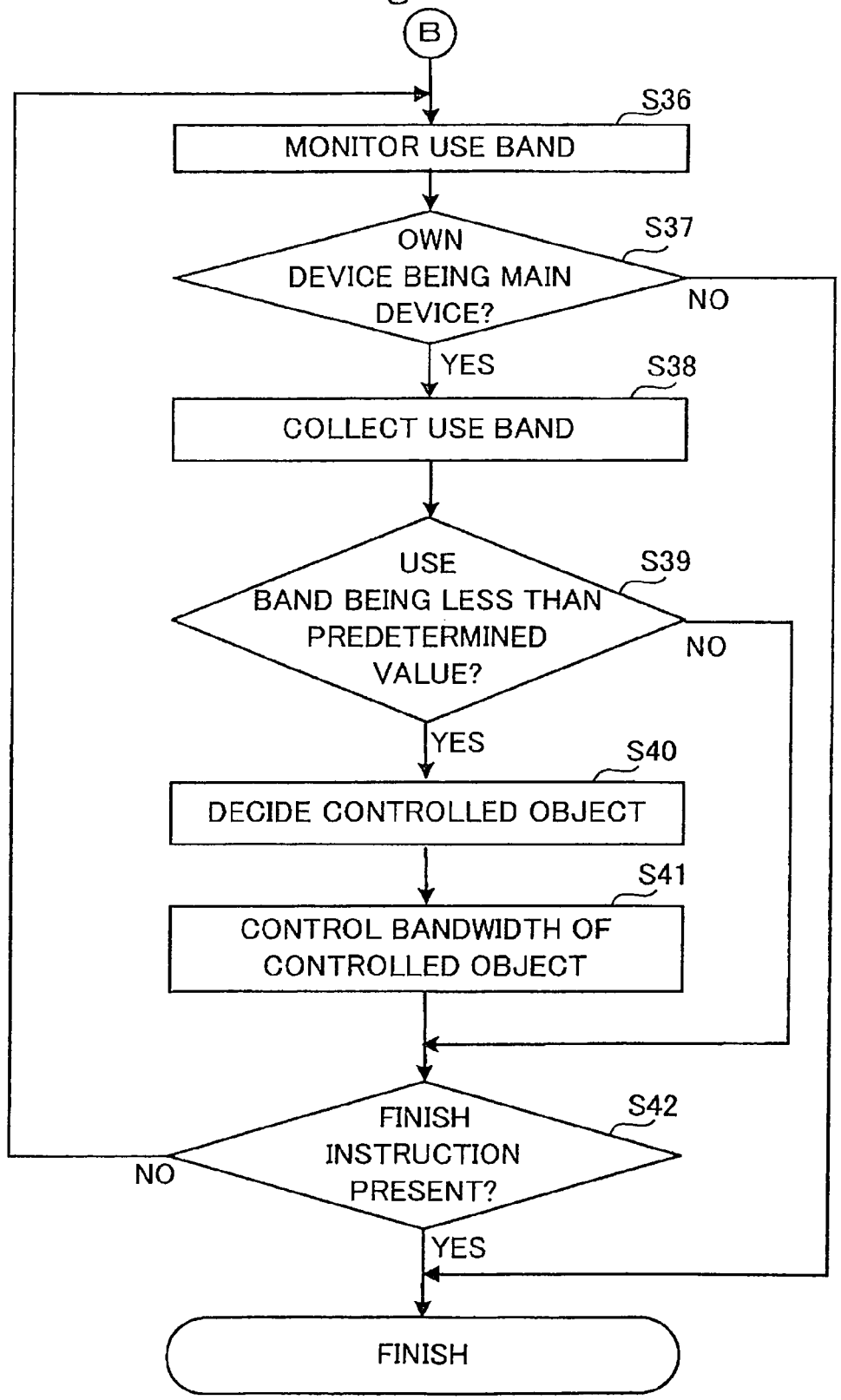
FIG. 18B is a flowchart showing one example of the main processing in the video conference terminal device according to the second embodiment of the present invention.

In the video conference terminal device 6 according to the second embodiment of the present invention, control processing which the CPU 602 performs by reading the conference control program 611 stored in the first memory part 603 is explained in conjunction with FIG. 18A and FIG. 18B.

[Main Processing]

First, when the power source of the video conference terminal device 6 is turned on, the CPU 602 of the video conference terminal device 6 executes initial setting operation such as access permission to the first memory part 603 and the second memory part 604 and securing and initializing of work area. The CPU 602 allows the conference control program 611 to be executed by the CPU 602 and operates a function as the control part 608.

Next, as shown in FIG. 18A, the CPU 602 performs the connection processing with the video conference terminal devices 6 which constitute the communication partners who participate in the conference (step S31). The CPU 602 transmits a response signal to the video conference terminal device 6 which transmits a connection request signal and establishes a session with the video conference terminal device 6 thus performing the connection processing.

Next, the CPU 602 prompts setting of the conference (step S32). For example, the CPU 602 instructs a built-in display 606 which constitutes the own device (the video conference terminal device 6) to display a user information inputting screen corresponding to the above-mentioned user information inputting screen shown in FIG. 8 thus inviting the user to input user information. Here, the CPU 602 allows the user to select whether or not the own device (the video conference terminal device 6) is to be set as the main device which performs the bandwidth control described later. When the own device (the video conference terminal device 6) is set as the main device, following the inputting of the user information, the CPU 602 instructs the built-in display 606 of the own device (the video conference terminal device 6) to display a conference setting inputting screen corresponding to the conference setting inputting screen shown in FIG. 9 thus inviting the user to input the conference setting information. The user information and the conference setting information are stored in the second memory part 604 of the own device (the video conference terminal device 6).

Next, when the setting of the conference is finished, the CPU 602 collects terminal information on the video conference terminal devices 6 which constitute the respective communication partners and information on the connection paths between the own device (the video conference terminal device 6) and the video conference terminal devices 6 which constitute the communication partners (step S33).

Next, the CPU 602 executes grouping of the video conference terminal devices 6 (step S34). To be more specific, the CPU 602 decides the video conference terminal devices 6 to be sorted into the same group to which the own device (the video conference terminal device 6) belongs. For example, the CPU 602 detects the information on the connection paths by a method substantially equal to the above-mentioned "degree of agreement of the connection paths" method. Then, the CPU 602 sorts the video conference terminal devices 6 which constitute communication partners arranged in the vicinity of the own device (the video conference terminal device 6) into the same group as the own device (the video conference terminal device 6). When the grouping processing is finished, a group list is generated and is stored in the second memory part 604 of the own device (the video conference terminal device 6).

Next, the CPU 602 set the main device (step S35). To be more specific, the CPU 602 transmits and receives information on the video conference terminal devices 6 in the same group and the setting of the main device. Accordingly, one of the video conference terminal devices 6 in the group is set as the main device at random. Here, in the video conference terminal device 6 set as the main device, the set value of a main device setting flag to be stored in the second memory part 604 of the video conference terminal device 6 is changed from "0" to "1".

Next, as shown in FIG. 18B, the CPU 602 monitors the use bands of the own device (video conference terminal devices 6) respectively (step S36).

Next, the CPU 602 determines whether or not the own device (video conference terminal devices 6) constitutes the main device (step S37).

To be more specific, the CPU 202 determines whether or not the set value of the main device setting flag to be stored in the second memory part 604 is set to "1". When the CPU 602 determines that the own device (video conference terminal devices 6) constitutes the main device (step S37: YES), the processing advances to step S38. On the other hand, when the CPU 602 determines that the own device (video conference terminal devices 6) does not constitute the main device (step S37: NO), the CPU 602 finishes the main processing.

Next, the CPU 602 collects information on the use bands of the video conference terminal devices 6 in the same group (step S38). Sequentially, the CPU 602 calculates the use band of the group to which the own device (the video conference terminal device 6) belongs and, thereafter, determines whether or not the use band of the group to which the own device (the video conference terminal device 6) belongs is less than a predetermined value (step S39). When the CPU 602 determines that the use band is less than the predetermined value (step S39: YES), the CPU 602 advances the processing to step S40. On the other hand, when the CPU 602 determines that the use band is not less than the predetermined value (step S39: NO), the CPU 602 advances the processing to step S42 described later.

Next, the CPU 602 decides a controlled object (step S40). To be more specific, looking up the group list, the CPU 602 changes the set values of object setting flags of the respective video conference terminal devices 6 which belong to the group whose use band is determined to be less than the predetermined value in step S39 from "0" to "1".

Next, the CPU 602 controls the bandwidth of the controlled object (step 41). To be more specific, the CPU 602 of the video conference terminal device 6 which constitutes the main device allocates the bandwidths to the video conference terminal devices 6 in the same group and, at the same time, transmits control signals for controlling the bandwidths to the video conference terminal devices 6 which constitute the communication partners for the video conference terminal devices 6 in the same group.

For example, in the video conference terminal devices 6*a*, 6*b*, 6*c* which belong to the group D shown in FIG. 12, priority is set as follows.

(1) In the priority decision file 614, high priority is assigned to the video conference terminal device 6*a*, and low priority is assigned to the video conference terminal devices 6*b*, 6*c*.

(2) A rate of allocated bandwidths is set such that 50% of the use band is allocated to the video conference terminal device 6*a*, and 25% of the use band is allocated to the video conference terminal devices 6*b*, 6*c* respectively.

(3) The predetermined value of 3 Mbps is set in the use band setting file 613.

Here, assume a case where the use band of the group D is 2.4 Mbps, and the video conference terminal devices 6*a*, 6*b*, 6*c* perform communication with the video conference terminal devices 6*d*, 6*e*, 6*f* respectively as a result of monitoring by the band monitoring unit. In this case, the bandwidth of 1.2 Mbps is allocated to the video conference terminal device 6*a*, and the bandwidth of 0.6 Mbps is allocated to the video conference terminal devices 6*b*, 6*c* respectively. That is, the bandwidth control unit transmits control signals to the video conference terminal devices 6*a*, 6*b*, 6*c* to perform a control such that the conference information is transmitted from the video conference terminal devices 6*a*, 6*b*, 6*c* respectively with the bandwidths of 1.2 Mbps, 0.6 Mbps, 0.6 Mbps. At the same time, the bandwidth control unit transmits control signals to the video conference terminal devices 6*d*, 6*e*, 6*f* to perform a control such that the conference information is transmitted from the video conference terminal devices 6*d*, 6*e*, 6*f* which constitute the communication partners for the video conference terminal devices 6*a*, 6*b*, 6*c* respectively with the bandwidths of 1.2 Mbps, 0.6 Mbps, 0.6 Mbps.

Next, the CPU 602 determines whether or not the finish instruction is present (step S42). When the CPU 602 determines that the finish instruction is present (step S42: YES), the CPU 602 changes a set value of a main device setting flag from "1" to "0" thus finishing the main processing. On the other hand, when the CPU 602 determines that the finish instruction is not present (step S42: NO), the CPU 602 returns the processing to step S36. These processing are equal to the processing executed in the above-mentioned step S11 and hence, the detailed explanation of the processing is omitted. Further, in the processing executed in steps S39 to S41, the CPU 602 decides one video conference terminal device 6 which executes the processing in steps S39 to S41 among the video conference terminal devices 6 such that the video conference terminal devices 6 which belong to the same group do not simultaneously execute the processing in steps S39 to S41, and one video conference terminal 6 out of the video conference terminal devices 6 which belong to the same group executes the processing in steps S39 to S41.

As has been explained heretofore, according to the video conference terminal device 6 of the video conference system 5 of the second embodiment of the present invention, in the same manner as the conference control device 2 of the video conference system of the first embodiment described above, the grouping unit performs grouping based on the information on the connection paths, the band monitoring unit monitors the use band of the communication processing unit in accordance with every group, and the band width control unit controls, when the use band is less than the predetermined value, the use band of the information processing unit or the bandwidths of the video conference terminal devices 6 which belong to the same group as the own device (video conference terminal devices 6). Accordingly, the plurality of video conference terminal devices 6 can be grouped based on the information on the connection paths, and the bandwidths can be controlled in accordance with every group and hence, the bandwidths can be effectively controlled.

[Regrouping]

Figure 19:
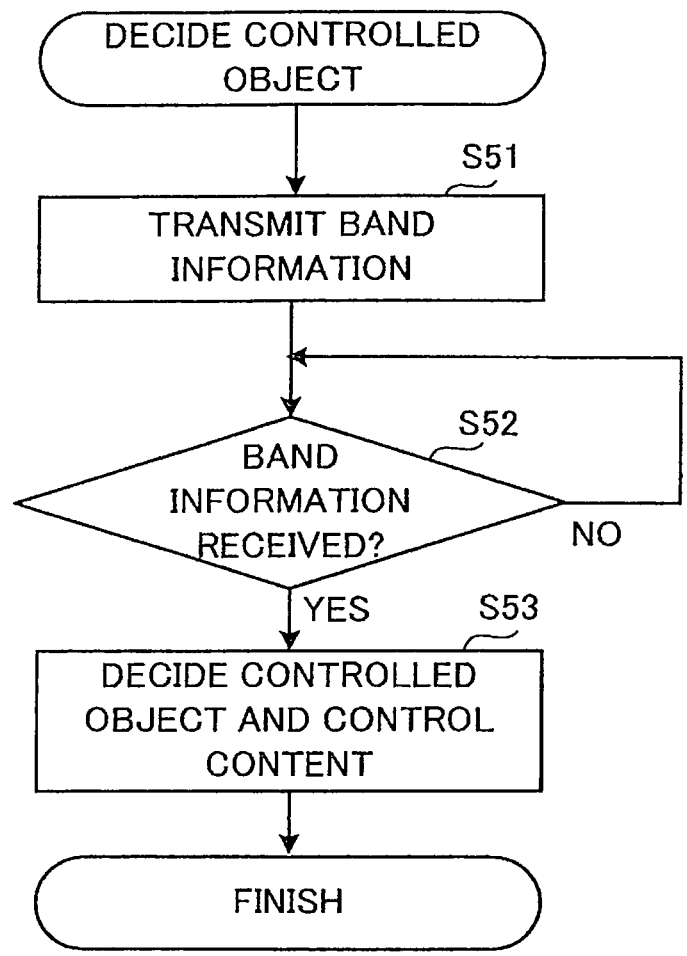
FIG. 19 is a flowchart showing controlled object decision processing by regrouping in the video conference terminal device according to the second embodiment of the present invention.

Further, the conference control device 6 according to this embodiment is, as described above, configured to select a controlled object by performing regrouping which performs grouping more finely within a group formed by temporarily performing grouping. FIG. 19 shows processing "decide controlled object" in step S37 shown in FIG. 18B.

[Decision of Controlled Object]

As shown in FIG. 19, the CPU 602 transmits the band information to the video conference terminal devices 6 which constitute respective communication partners within the group (step S51). To be more specific, the CPU 602 looks up the group list, and transmits information on the use band (hereinafter referred to as "band information") of the own device (video conference terminal devices 6) to the video conference terminal devices 6 which constitute communication partners within the group to which the own device belongs.

Next, the CPU 602 stands by while determining whether or not band information is received from the video conference terminal devices 6 which constitute respective communication partners within the group (step S52). When the CPU 602 determines that the band information is received (step S52: YES), the CPU 602 advances the processing to step S53.

Next, the CPU 602 decides a controlled object and a control content based on the band information and the terminal information (step S53). To be more specific, the CPU 602 looks up the use band setting file 613, and determines whether or not the use bands of the respective video conference terminal devices 6 are less than a predetermined value. Subsequently, the CPU 602 looks up the group list, and changes a set value of an object setting flag of the video conference terminal device 6 whose use band is determined to be less than the predetermined value from "0" to "1" thus finishing this processing.

As has been explained heretofore, according to this application example, also in the P2P-type video conference system, regrouping can be realized and hence, the bandwidth control can be effectively performed in the same manner as the video conference terminal devices of the video conference system of the above-mentioned first embodiment.

(Modification)

Next, a modification of the second embodiment is explained. A video conference system of this modification is a P2P-type video conference system which is constituted of a conference control device and a plurality of video conference terminal devices. In the video conference system of this modification, the video conference is held such that terminal information and information on connection paths are transmitted and received between the conference control device and the respective video conference terminal devices, and conference information is transmitted and received between the respective video conference terminal devices. Further, in this video conference system, each video conference terminal device performs monitoring of use bands and a control of bandwidths.

To be more specific, in the video conference system of this modification, the respective video conference terminal devices establish a session with the conference control device and perform setting of the conference using the above-mentioned method. Then, the conference control device collects the terminal information of the respective video conference terminal devices and information on the connection paths using the above-mentioned method, and transmits the collected terminal information and the collected information on connection paths to the respective video conference terminal devices. Then, each video conference terminal device specifies the video conference terminal device which constitutes a communication partner based on the terminal information and the information on the connection paths transmitted from the conference control device, and performs the transmission/reception of the conference information with the video conference terminal device which constitutes the communication partner thus realizing the video conference.

Further, in the video conference system of this modification, the respective video conference terminal devices perform grouping using the above-mentioned method based on the above-mentioned terminal information and information on the connection paths. Then, each video conference terminal device monitors a use band of the own device and, at the same time, determines whether or not the use band is less than a predetermined value. When the use band of the own device is determined to be less than the predetermined value, each video conference terminal device controls bandwidths of the respective video conference terminal devices which belong to the group formed by the above-mentioned grouping corresponding to predetermined setting.

As has been explained heretofore, according to the video conference terminal device 6 of the video conference system of this modification, also in the P2P-type video conference system which includes the conference control device, the plurality of video conference terminal devices are grouped into a plurality of groups, and bandwidths of the video conference terminal devices can be controlled by monitoring the use bands in accordance with every group. The above-mentioned regrouping can also be performed in this modification.

What is claimed is:

1. A conference control device comprising:
a communication processing unit which is configured to perform transmission/reception processing of conference information containing at least one of voice information and image information between the conference control device and a plurality of video conference terminal devices through an IP network;
an information collecting unit which is configured to collect IP addresses relating to connection paths between the conference control device and the respective video conference terminal devices;
a grouping unit which is configured to sort the plurality of video conference terminal devices into a plurality of groups based on the IP addresses relating to the connection paths collected by the information collecting unit;
a band monitoring unit which is configured to monitor a use band of the communication processing unit for each of the plurality of groups into which the video conference terminal devices are sorted by the grouping unit; and
a bandwidth control unit which is configured to, when the presence of the group having the use band of less than a predetermined value is detected by the band monitoring unit, control the bandwidth of the video conference terminal devices which belong to the group having the use band of less than a predetermined value.

2. The conference control device according to claim 1, wherein the conference control device further includes a priority memory unit which is configured to store priority in allocating the bandwidths to the respective video conference terminal devices, and
the bandwidth control unit is configured to allocate a small bandwidth to the video conference terminal device with low priority stored in the priority memory unit compared to a bandwidth of the video conference terminal device with high priority stored in the priority memory unit.

3. The conference control device according to claim 1, wherein the conference control device includes a priority decision unit which is configured to decide priority in allocating the bandwidths to the respective video conference terminal devices, and
the bandwidth control unit is configured to allocate a small bandwidth to the video conference terminal device with low priority decided by the priority decision unit compared to a bandwidth of the video conference terminal device with high priority decided by the priority decision unit.

4. The conference control device according to claim 3, wherein the priority decision unit is configured to decide the priority such that the larger a speech amount made by a user in the video conference terminal device, the higher the priority becomes based on voice information acquired from the respective video conference terminal devices through the communication processing unit.

5. The conference control device according to claim 3, wherein the conference information contains information on usages of the respective video conference terminal devices in the conference, and the priority decision unit is configured to decide the priority of the respective video conference terminal device corresponding to the information on the usages acquired from the video conference terminal devices by the communication processing unit.

6. The conference control device according to claim 3, wherein the conference information contains information on degree of importance of users of the respective video conference terminal devices in a conference, and the priority decision unit is configured to decide the priority of the respective video conference terminal devices corresponding to the degree of importance of the users in the conference acquired from the video conference terminal devices by the communication processing unit.

7. The conference control device according to claim 1, wherein the conference control device further includes a priority setting unit which is configured to set priority corresponding to a kind of information contained in the conference information, and the bandwidth control unit is configured to allocate a larger bandwidth to information with high priority set by the priority setting unit.

8. The conference control device according to claim 1, wherein, the information collecting unit is configured to collect IP addresses of the respective video conference terminal devices as IP addresses relating to the connection paths, and the grouping unit which is configured to determine a domain to which said each video conference terminal device belongs based on the IP addresses collected by the information collecting unit, and is configured to sort the video conference terminal devices which belong to the same domain into the same group.

9. The conference control device according to claim 1, wherein, the information collecting unit is configured to sequentially transmit a packet to the respective video conference terminal devices while increasing a value of TTL (Time to Live) whose numerical value is decreased corresponding to the number of routers which the packet passes, and is configured to detect an IP address of the router present between the conference control device and said each video conference terminal device as IP addresses relating to the connection paths based on a response packet transmitted from the router when the TTL of the packet becomes O, and the grouping unit allocates the respective video conference terminal devices into a plurality of groups based on the IP addresses collected by the information collecting unit.

10. The conference control device according to claim 1, wherein the bandwidth control unit is configured to control the bandwidth by changing a compression rate of the conference information.

11. A recording medium for recording a computer readable program, the program allowing the computer to execute the steps of:

performing transmission/reception processing of conference information containing at least one of voice information and image information between the computer and a plurality of video conference terminal devices through an IP network using a communication processing part;

collecting IP addresses relating to connection paths between the computer and the respective video conference terminal devices;

sorting the plurality of video conference terminal devices into a plurality of groups based on the collected IP addresses relating to the connection paths;

monitoring a use band of the communication processing part for each of the plurality of groups; and controlling, when the group having the use band of less than a predetermined value is present, the bandwidth of the respective video conference terminal devices which belong to the group having the use band of less than a predetermined value.

12. A band control method in a conference control device comprising the steps of:

performing transmission/reception processing of conference information containing at least one of voice information and image information between a conference control device and a plurality of video conference terminal devices through an IP network using a communication processing unit;

collecting IP addresses relating to connection paths between the conference control device and the respective video conference terminal devices;

sorting the plurality of video conference terminal devices into a plurality of groups based on the collected IP addresses relating to the connection paths;

monitoring a use band of the communication processing unit for each of the plurality of groups; and controlling, when the group having the use band of less than a predetermined value is present, the bandwidth of the respective video conference terminal devices which belong to the group having the use band of less than a predetermined value.

13. A video conference system comprising:

a plurality of video conference terminal devices; and a conference control device which is connected to the video conference terminal devices through an IP network and is configured to control communication between the conference control device and the video conference terminal devices, wherein the conference control device comprises:

a communication processing unit which is configured to perform transmission/reception processing of conference information containing at least one of voice information and image information between the conference control device and the video conference terminal devices through an IP network;

an information collecting unit which is configured to collect IP addresses relating to connection paths between the conference control device and the respective video conference terminal devices;

a grouping unit which is configured to sort the plurality of video conference terminal devices into a plurality of groups based on the IP addresses relating to the connection paths collected by the information collecting unit;

a band monitoring unit which is configured to monitor a use band of the communication processing unit for each of the plurality of groups into which the video conference terminal devices are sorted by the grouping unit; and a bandwidth control unit which is configured to, when the presence of the group having the use band of less than a predetermined value is detected by the band monitoring unit, control the bandwidth of the video conference terminal devices which belong to the group having the use band of less than a predetermined value.

14. A video conference terminal device in a video conference system in which a plurality of video conference terminal devices are connected through an IP network and perform conference communication between the video conference terminal devices, each of the video conference terminal device comprising:

a communication processing unit which is configured to perform transmission/reception processing of conference information containing at least one of voice information and image information between the video conference terminal device and a video conference terminal device which constitutes a communication partner through the IP network;

an information collecting unit which collects IP addresses relating to connection paths between the video conference terminal device and the respective video conference terminal devices which constitute the communication partners;

a grouping unit which is configured to sort the plurality of video conference terminal devices into a plurality of groups based on the IP addresses relating to the connection paths collected by the information collecting unit;

a band monitoring unit which is configured to monitor a use band of the group which includes the video conference terminal device out of the groups formed by grouping; and a bandwidth control unit which is configured to, when the presence of the group having the use band of less than a predetermined value is detected by the band monitoring unit, control a bandwidth of the communication processing unit or a bandwidth of the video conference terminal devices which belong to the group to which the video conference terminal device belongs.

* * * * *